US008113667B2

(12) United States Patent
Yamada et al.

(10) Patent No.: US 8,113,667 B2
(45) Date of Patent: Feb. 14, 2012

(54) PROJECTION OPTICAL SYSTEM

(75) Inventors: Keiko Yamada, Skai (JP); Kohtaro Hayashi, Toyonaka (JP); Soh Ohzawa, Toyonaka (JP); Masayuki Imaoka, Izumiotsu (JP)

(73) Assignee: Konica Minolta Opto, Inc., Tokyo (JP)

( * ) Notice: Subject to any disclaimer, the term of this patent is extended or adjusted under 35 U.S.C. 154(b) by 361 days.

(21) Appl. No.: 12/529,242

(22) PCT Filed: Feb. 25, 2008

(86) PCT No.: PCT/JP2008/053181
§ 371 (c)(1),
(2), (4) Date: Aug. 31, 2009

(87) PCT Pub. No.: WO2008/108204
PCT Pub. Date: Sep. 12, 2008

(65) Prior Publication Data
US 2010/0118281 A1    May 13, 2010

(30) Foreign Application Priority Data

Mar. 1, 2007   (JP) ................................. 2007-051154

(51) Int. Cl.
*G03B 21/28* (2006.01)
(52) U.S. Cl. ................ 353/99; 353/30; 353/31; 353/37; 353/78; 353/79; 353/98; 353/101; 359/726; 359/727; 359/728; 359/729; 359/730; 359/731; 359/732
(58) Field of Classification Search ..................... 353/30, 353/31, 37, 78, 79, 98, 99, 101; 359/726, 359/727, 728, 729, 730, 731, 732, 733, 734, 359/735, 736, 649, 650, 651; 398/139
See application file for complete search history.

(56) References Cited

U.S. PATENT DOCUMENTS

| 6,624,952 B2 * | 9/2003 | Kuwa et al. ................... 359/726 |
| 7,048,388 B2 * | 5/2006 | Takaura et al. ................. 353/99 |
| 2006/0140635 A1 | 6/2006 | Yamamoto ..................... 398/139 |

(Continued)

FOREIGN PATENT DOCUMENTS

JP    2001-215412 A    8/2001
(Continued)

*Primary Examiner* — Georgia Y Epps
*Assistant Examiner* — Sultan Chowdhury
(74) *Attorney, Agent, or Firm* — Cozen O'Connor

(57) ABSTRACT

A projection optical system satisfies a conditional formula: $0.01<\{(\tan\theta f1-\tan\theta f2)-(\tan\theta n1-\tan\theta n2)\}\cdot(\beta 2/\beta 1)<0.20$ where the direction of a normal to and the direction of a long side of the screen of the screen surface are referred to as a "z-direction" and an "x-direction", respectively, the x-z plane component of the angle of incidence with respect to the screen surface is referred to as an "incident angle $\theta$" and when, among rays that pass through the center of an aperture and that are incident on the ends of the upper and lower sides of the screen of the screen surface, the incident angle $\theta$ of rays whose incident angle $\theta$ is larger is referred to as "$\theta f$" and the incident angle $\theta$ of rays whose incident angle $\theta$ is smaller is referred to as "$\theta n$", $\theta n$ and $\theta f2$ respectively represent, when the absolute value of a projection magnification is the highest or lowest during focus adjustment, the incident angle $\theta f$, $\theta n1$ and $\theta n2$ respectively represent, when the absolute value of the projection magnification is the highest or lowest during focus adjustment, the incident angle $\theta n$, and $\beta 1$ and $\beta 2$ respectively represent the maximum and minimum values of the projection magnification during focus adjustment (except that $\beta 1$ and $\beta 2$ respectively represent, if the projection magnification is negative, a value of the projection magnification when the absolute value thereof is the highest or lowest).

26 Claims, 23 Drawing Sheets

U.S. PATENT DOCUMENTS

| | | |
|---|---|---|
| 2007/0201009 A1* | 8/2007 | Suzuki et al. .................. 353/78 |
| 2007/0291236 A1 | 12/2007 | Hirata et al. .................. 353/77 |
| 2009/0059185 A1* | 3/2009 | Hisada et al. .................. 353/98 |

FOREIGN PATENT DOCUMENTS

| | | |
|---|---|---|
| JP | 2004-258620 A | 9/2004 |
| JP | 2005-106900 A | 4/2005 |
| JP | 2006-184775 A | 7/2006 |
| JP | 2007-334052 A | 12/2007 |
| WO | WO 2008/108204 A1 | 9/2008 |

* cited by examiner

FIG.3
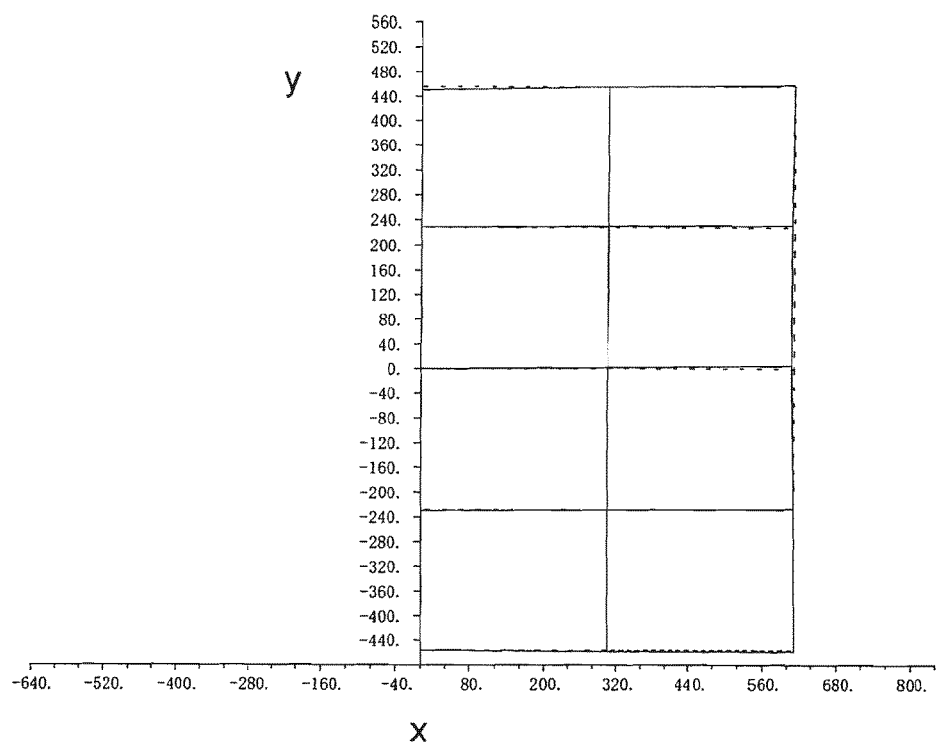
(A)
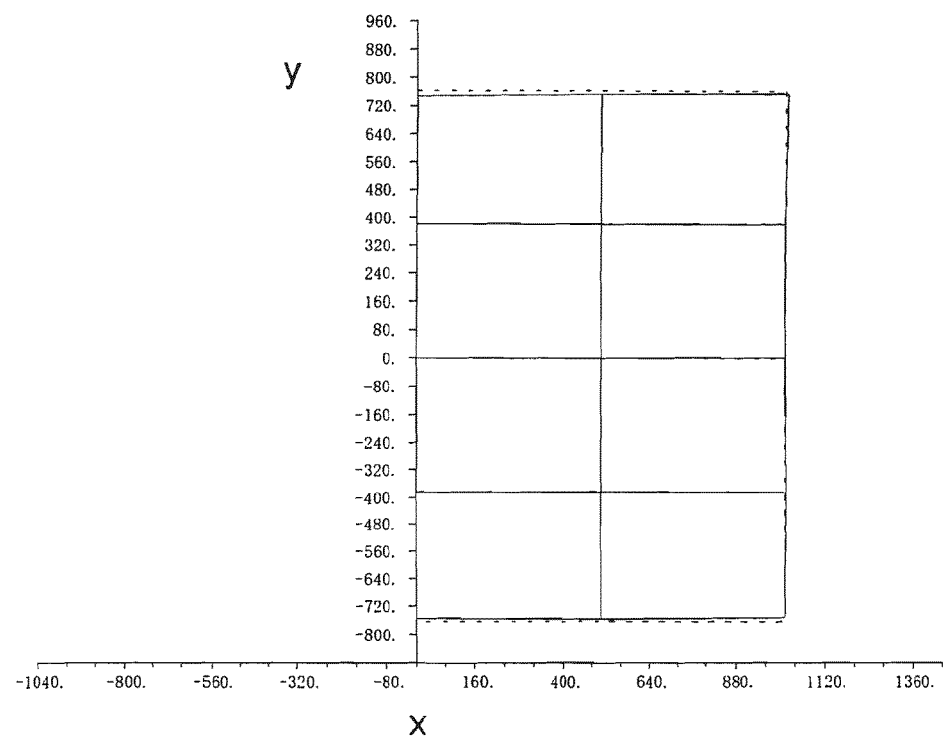
(B)

FIG.6
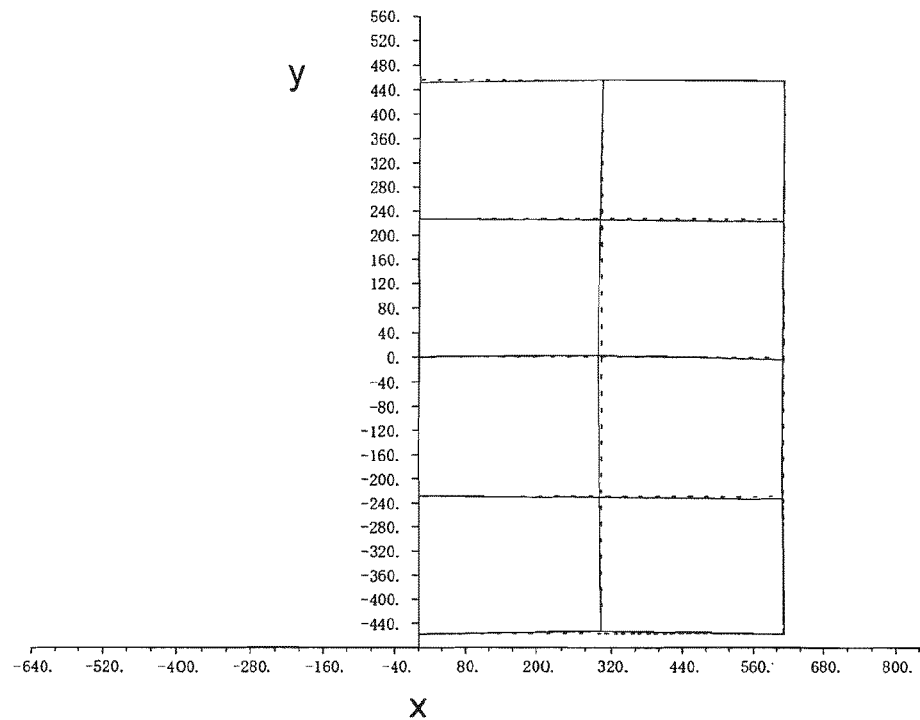
(A)
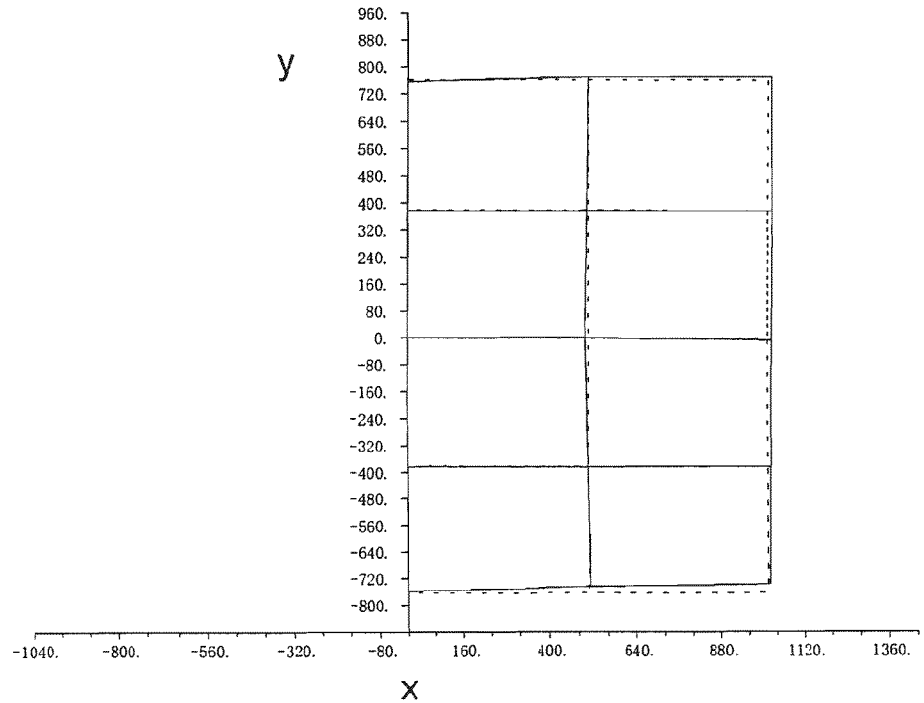
(B)

FIG.9
(A)
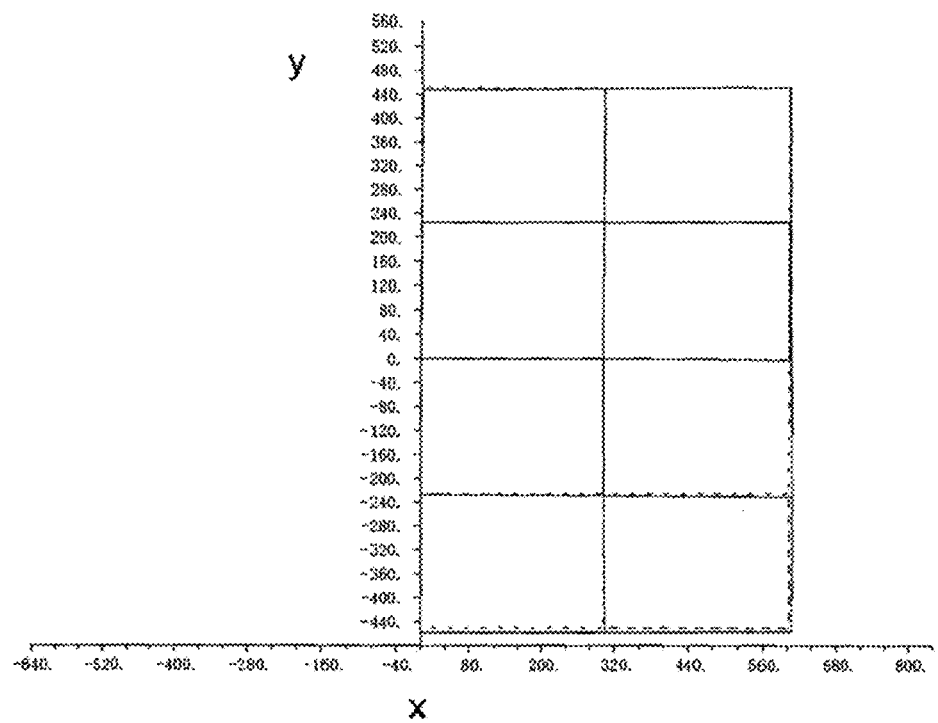
(B)
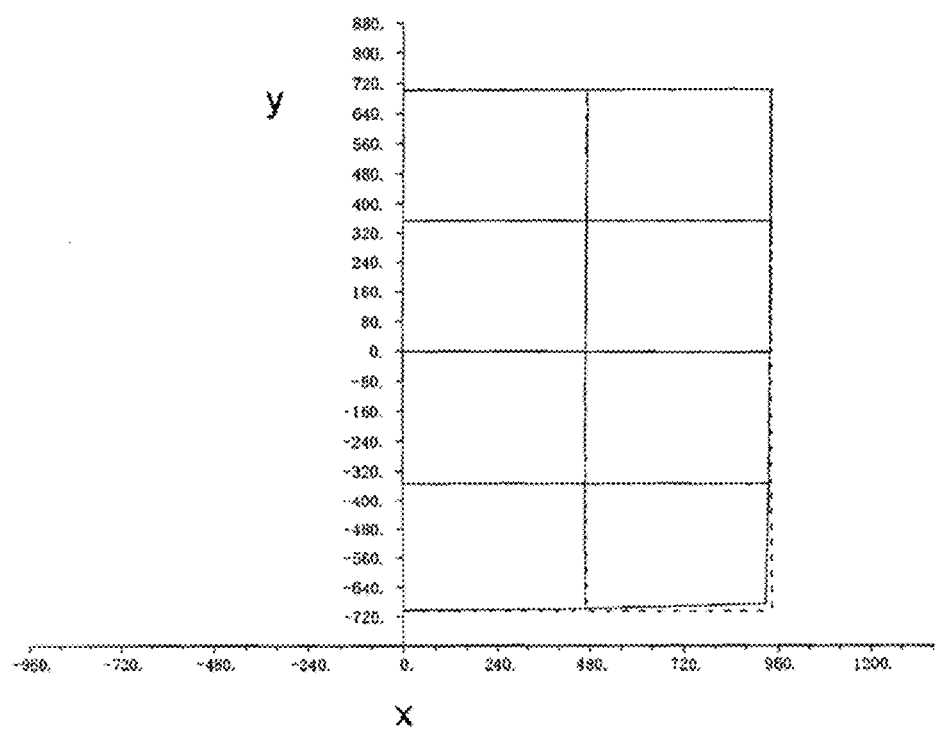

FIG.15
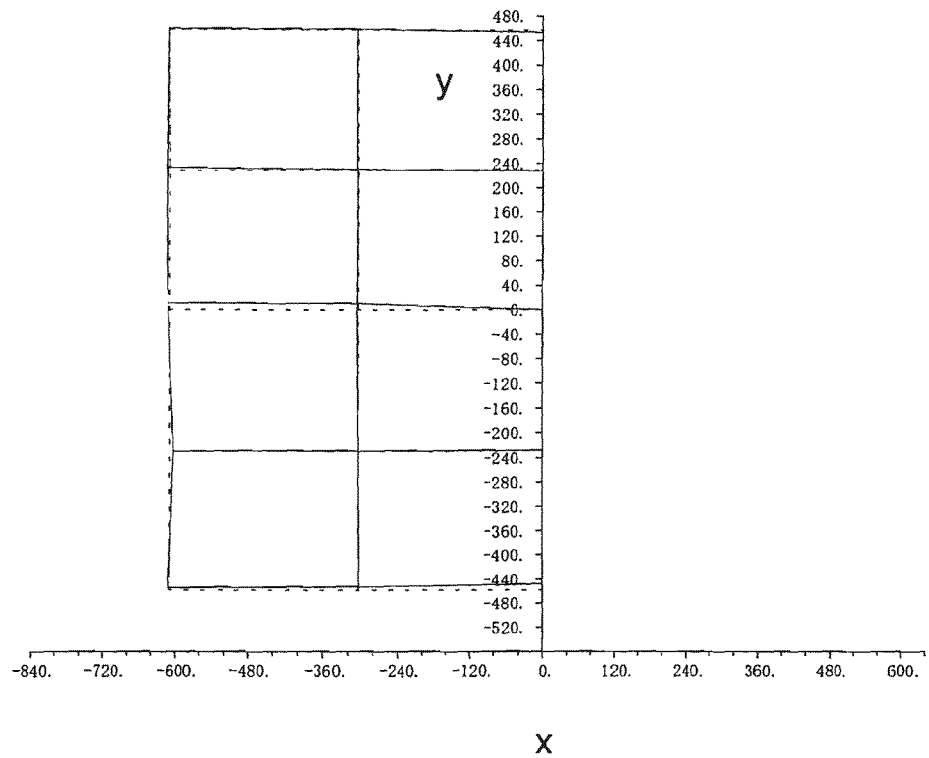
(A)
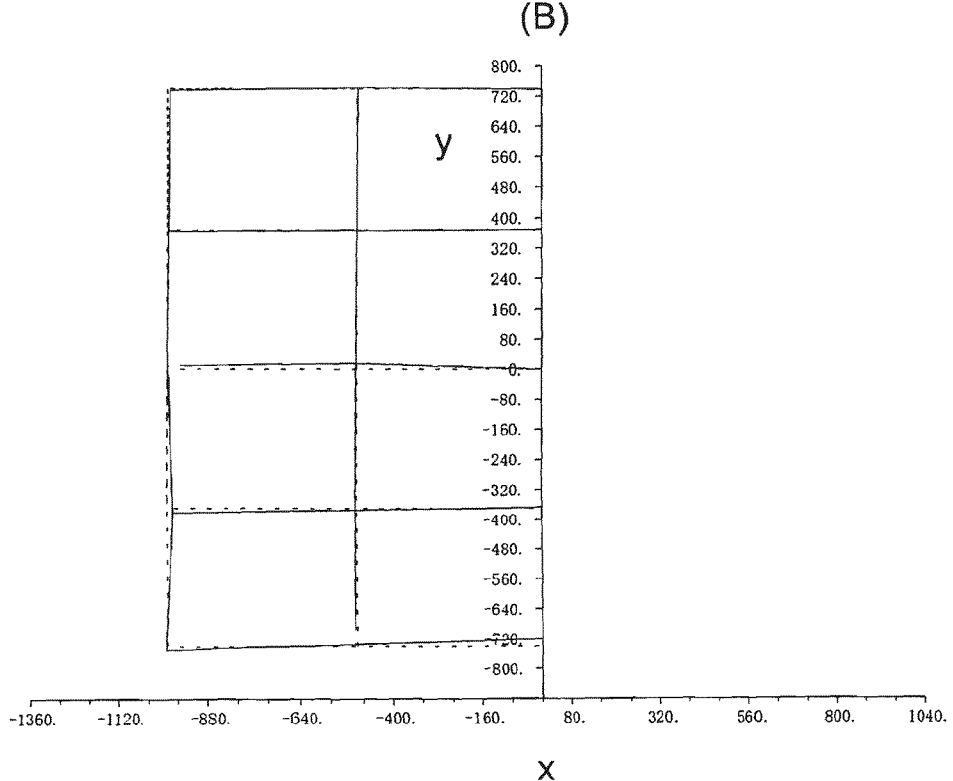
(B)

FIG.18
(A)
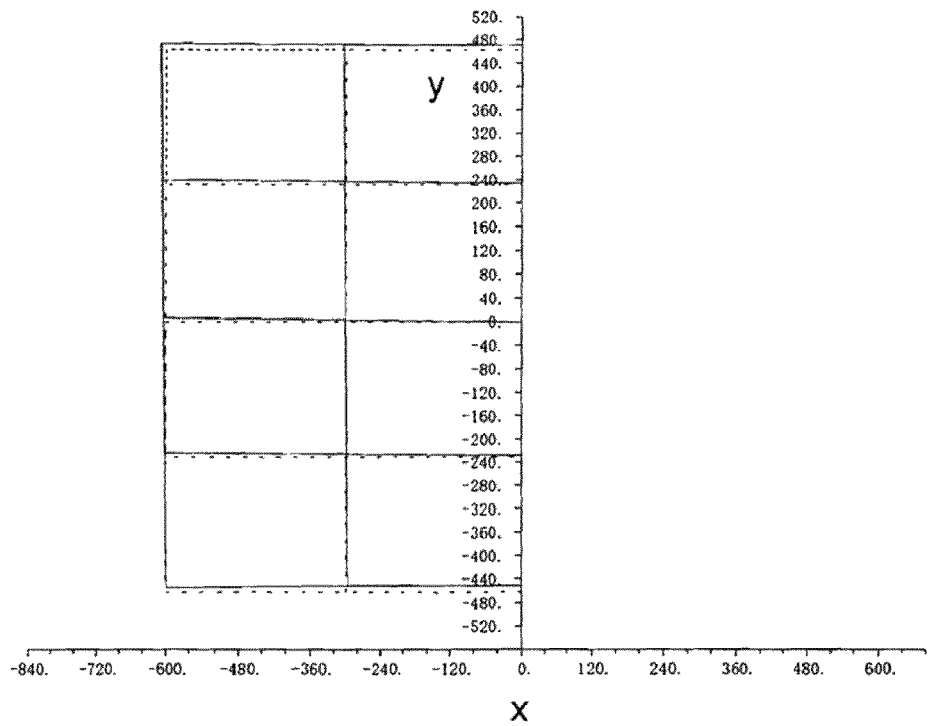
(B)
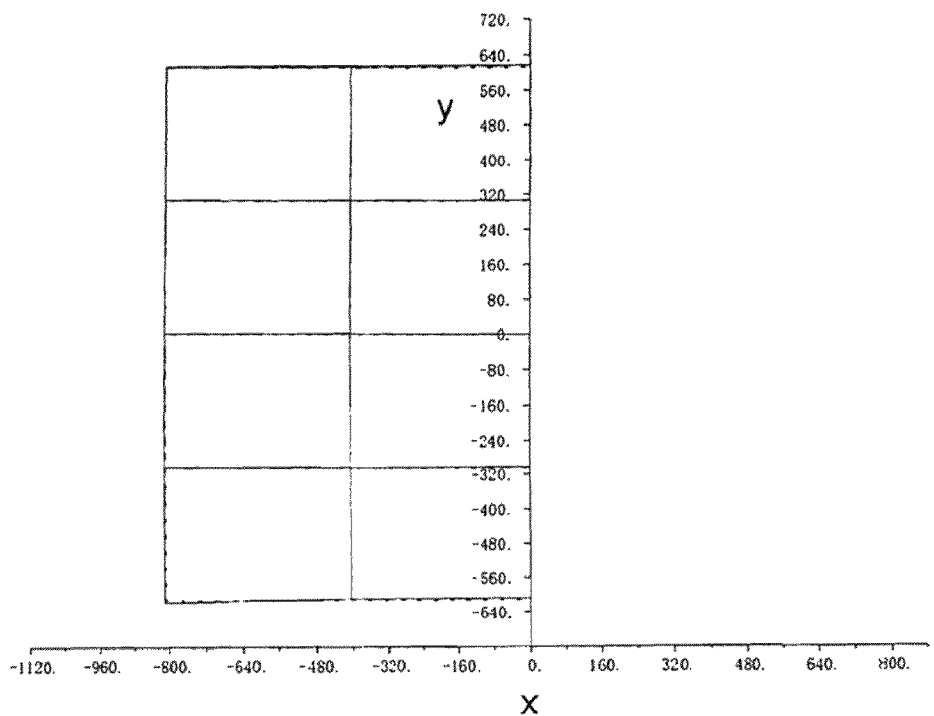

FIG. 19
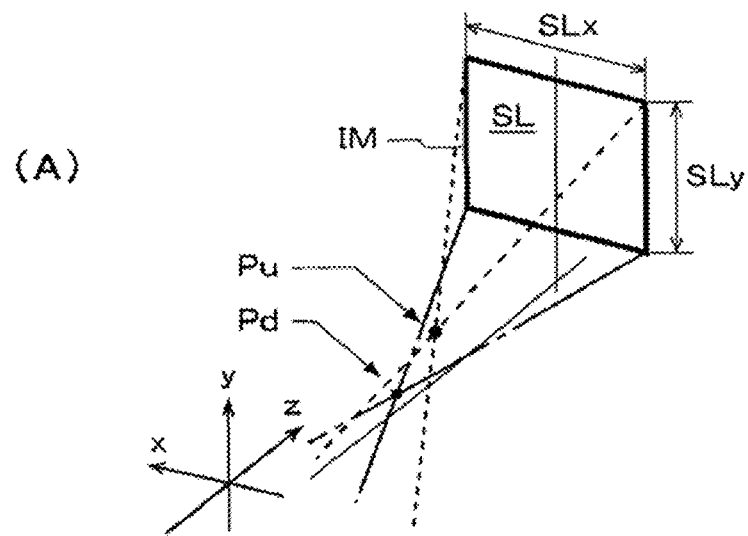
(A)
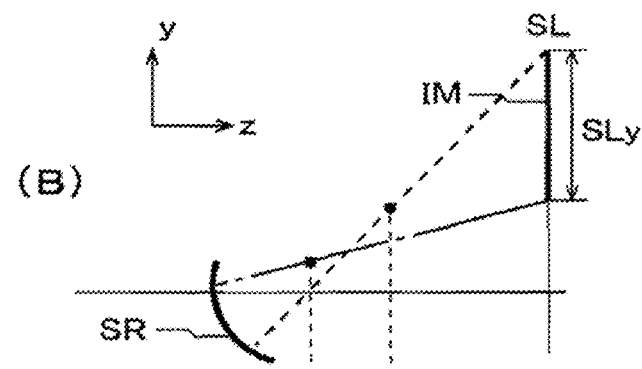
(B)
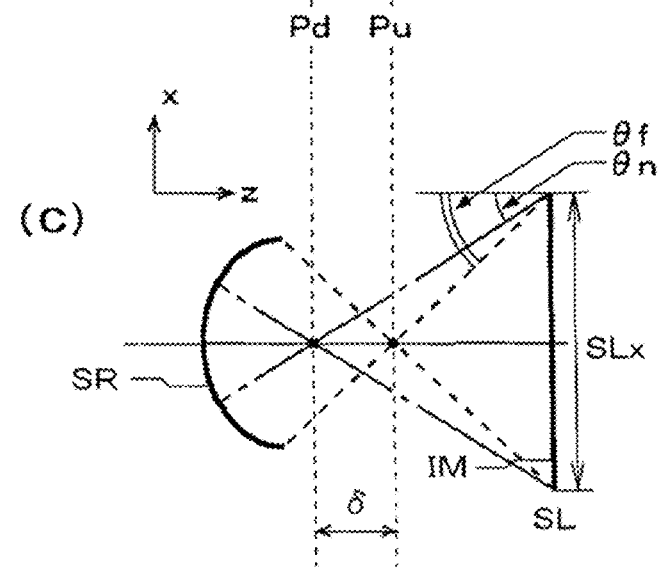
(C)

FIG.21
(A)
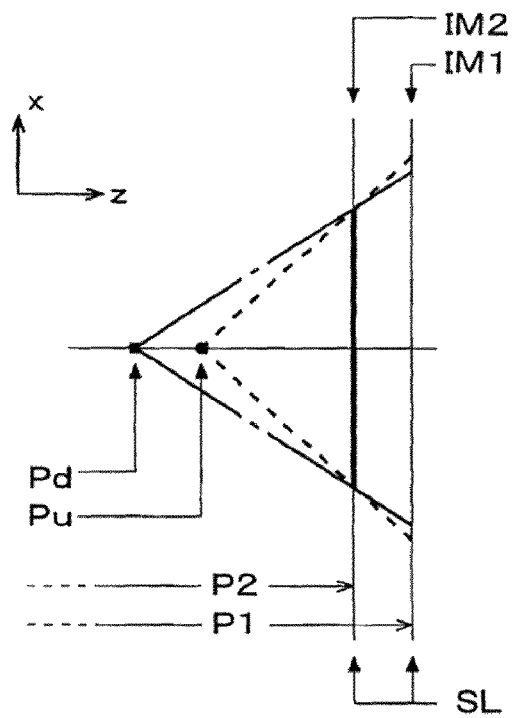
(B)
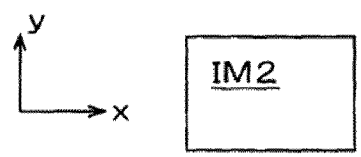
(C)
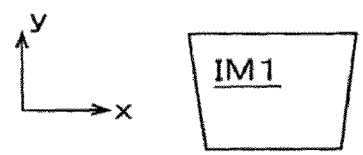

FIG.22
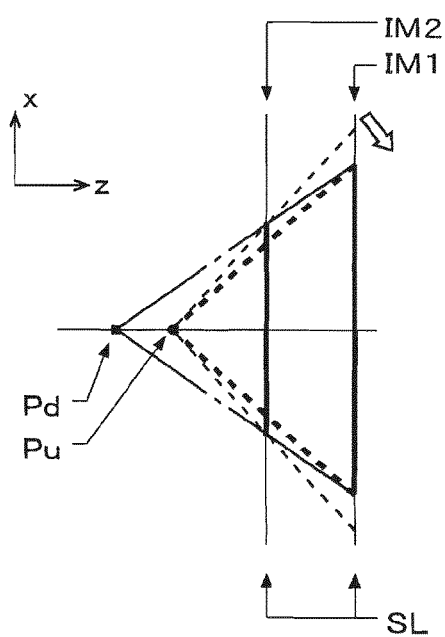
(A)
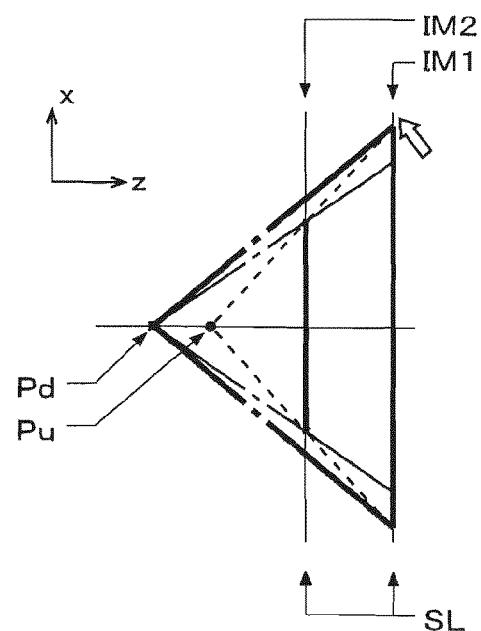
(B)

FIG.23
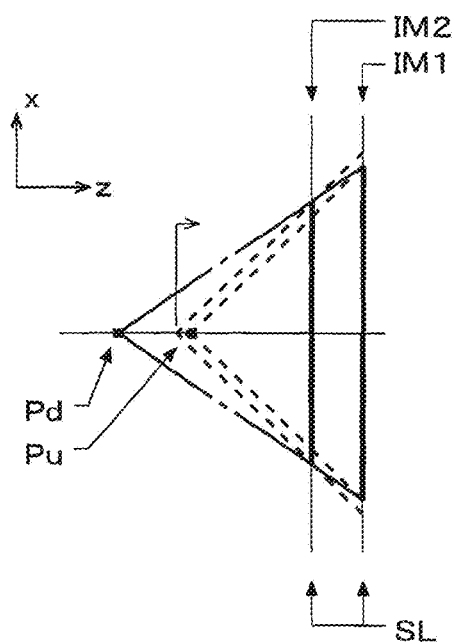
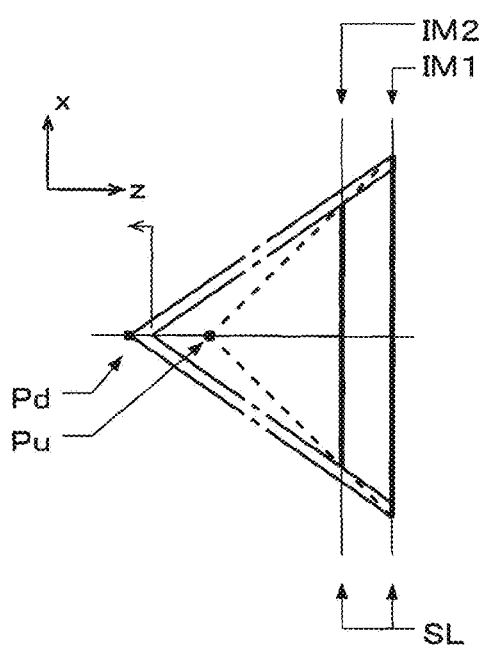

PROJECTION OPTICAL SYSTEM

RELATED APPLICATIONS

This application is a U.S. National Phase Application under 35 USC 371 of International Application PCT/JP2008/053181, filed Feb. 25, 2008, which claims priority to Japanese Patent Application No. 2007-051154, filed Mar. 1, 2007.

TECHNICAL FIELD

The present invention relates to a projection optical system and relates to, for example, a projection optical system that is incorporated in an image projection apparatus having a display device such as a liquid crystal display device or a digital micromirror device and that enlarges and projects an image on a display device surface onto a screen surface. The invention also relates to a projection optical instrument (in particular, a projection image display apparatus) incorporating such a projection optical system.

BACKGROUND ART

As highly portable computers (such as notebook personal computers) are becoming increasingly common, front projectors have come into widespread use in meetings and presentations in offices to enlarge and display images created on computers. As video information delivery such as digital broadcast is achieved in a variety of ways with higher resolution, projectors have come into widespread use even in homes where images are viewed on a large screen. However, the use of a conventional projector with a large screen makes it difficult to obtain a sufficiently large projection space such as in small- and medium-sized meeting rooms or homes. In other words, unless a sufficiently large projection space is obtained, it is difficult for the conventional projector to project images onto a large screen.

One known way to reduce a projection space required outside a projector to provide a larger screen is to introduce a reflective surface into a projection optical system to fold, into the projection optical system, an optical path of a light beam used for forming a projected image. Another known way is to increase the angle of incidence of a light beam with respect to a screen surface to reduce the distance from a projection optical system to a screen. For example, in patent document 1, there is proposed a construction in which an optical path is folded by a reflective surface and this increases the angle of incidence of a light beam to reduce a projection space.

In the case of a front projector, where the projector and an observer are located on the same side with respect to a screen, the distance from a projection optical system to the screen is usually varied each time the projector is used. Thus, it is convenient to be able to adjust focus according to the distance from the projection optical system to the screen. In patent documents 2 and 3, there are proposed projection optical systems in which an optical path is folded by a reflective surface and this allows focus adjustment.
Patent document 1: JP-A-2004-258620
Patent document 2: JP-A-2006-184775
Patent document 3: JP-A-2005-106900

DISCLOSURE OF THE INVENTION

Problems to be Solved by the Invention

As described above, an optical path within a projection optical system is folded by a reflective surface, and the angle of incidence of rays with respect to a screen surface is increased, with the result that the screen of a projector can be increased in size and a projection space can be reduced. However, as the viewing angle of a projection optical system is increased and this increases the angle of incidence of rays with respect to a screen surface, the difference between the length of the optical path of rays incident on the screen upper ends of the screen surface and the length of the optical path of rays incident on the screen lower ends of the screen surface is increased. Consequently, when a projection distance is varied, trapezoidal distortion is significantly produced, and it is thus necessary to correct the trapezoidal distortion simultaneously when focus is adjusted.

Since a construction that can achieve focus is not disclosed in patent document 1, it is difficult to provide, with its projection optical system, a construction that can achieve focus. In patent documents 2 and 3, there is specifically proposed no method for correcting trapezoidal distortion that is produced when the angle of incidence of rays with respect to a screen is increased and simultaneously a projection distance is varied. Thus, the use of projection optical systems proposed in patent document 2 and 3 makes it difficult to correct trapezoidal distortion and obtain satisfactory performance.

In light of the foregoing, it is an object of the present invention to provide a projection optical system that not only increases the size of a screen but also decreases a projection distance and that can satisfactorily correct trapezoidal distortion produced when the projection distance is varied, and to provide a projection display apparatus incorporating such a projection optical system.

Means for Solving the Problem

To achieve the above object, according to a first aspect of the present invention, there is provided a projection optical system that receives light from a display device surface and enlarges and projects a display image thereon obliquely onto a screen surface and that varies a projection distance to a screen to display images of different projection magnifications, the projection optical system including one or more reflective surfaces having an optical power between the display device surface and the screen surface. In the projection optical system, focus is adjusted by moving at least one optical device having an optical power, and conditional formula (1) below is satisfied:

$$0.01 < \{(\tan \theta f1 - \tan \theta f2) - (\tan \theta n1 - \tan \theta n2)\} \cdot (\beta 2/\beta 1) < 0.20 \qquad (1)$$

where, when the screen of the display device surface is rectangular in shape, the direction of a normal to the screen of the screen surface is referred to as a "z-direction", the direction of a long side of the screen of the screen surface is referred to as an "x-direction", the x-z plane component of the angle of incidence with respect to the screen surface is referred to as an "incident angle θ (°)" and among rays that pass through the center of an aperture and that are incident on the ends of the upper and lower sides of the screen of the screen surface, the incident angle θ of rays whose incident angle θ is larger is referred to as "θf" and the incident angle θ of rays whose incident angle θ is smaller is referred to as "θn",
  θf1 represents, when the absolute value of a projection magnification is the highest during focus adjustment, the incident angle θf,
  θf2 represents, when the absolute value of the projection magnification is the lowest during focus adjustment, the incident angle θf, θn1 represents, when the absolute value of the projection magnification is the highest during focus adjustment, the incident angle θn, θn2 represents, when the absolute value of the projection magnification is the lowest during focus adjustment, the incident angle θn, β1 represents the maximum value of the projection magnification during focus adjustment (except that β1 represents, if the projection magnification is negative, a value of the projection magnification when the absolute value thereof is the highest) and β2 represents the minimum value of the projection magnification during focus adjustment (except that β2 represents, if the projection magnification is negative, a value of the projection magnification when the absolute value thereof is the lowest).

According to a second aspect of the invention, there is provided a projection optical system that receives light from a display device surface and enlarges and projects a display image thereon obliquely onto a screen surface and that varies a projection distance to a screen to display images of different projection magnifications, the projection optical system including one or more reflective surfaces having an optical power between the display device surface and the screen surface. In the projection optical system, focus is adjusted by moving at least one optical device having an optical power, and conditional formula (1) below is satisfied within at least a range specified by a formula "$1.3 \leqq \beta1/\beta2 \leqq 1.8$":

$$0.01 < \{(\tan\theta f1 - \tan\theta f2) - (\tan\theta n1 - \tan\theta n2)\} \cdot (\beta2/\beta1) < 0.20 \quad (1)$$

where, when the screen of the display device surface is rectangular in shape, the direction of a normal to the screen of the screen surface is referred to as a "z-direction", the direction of a long side of the screen of the screen surface is referred to as an "x-direction", the x-z plane component of the angle of incidence with respect to the screen surface is referred to as an "incident angle θ (°)" and among rays that pass through the center of an aperture and that are incident on the ends of the upper and lower sides of the screen of the screen surface, the incident angle θ of rays whose incident angle θ is larger is referred to as "θf" and the incident angle θ of rays whose incident angle θ is smaller is referred to as "θn", θf1 represents, when the absolute value of a projection magnification is the highest during focus adjustment, the incident angle θf, θf2 represents, when the absolute value of the projection magnification is the lowest during focus adjustment, the incident angle θf, θn1 represents, when the absolute value of the projection magnification is the highest during focus adjustment, the incident angle θn, θn2 represents, when the absolute value of the projection magnification is the lowest during focus adjustment, the incident angle θn, β1 represents the maximum value of the projection magnification during focus adjustment (except that β1 represents, if the projection magnification is negative, a value of the projection magnification when the absolute value thereof is the highest) and β2 represents the minimum value of the projection magnification during focus adjustment (except that β2 represents, if the projection magnification is negative, a value of the projection magnification when the absolute value thereof is the lowest).

According to a third aspect of the invention, there is provided a projection optical system that embodies the first or second aspect of the invention and that satisfies conditional formula (2):

$$38 < \theta f < 80 \quad (2)$$

According to a fourth aspect of the invention, there is provided a projection optical system that embodies the third aspect of the invention and in which a distance from the exit pupil of rays incident on the screen at the incident angle θf to the screen is shorter than a distance from the exit pupil of rays incident on the screen at the incident angle θn to the screen.

According to a fifth aspect of the invention, there is provided a projection optical system that embodies any one of the first to four aspects of the invention and that satisfies conditional formula (3):

$$1 < \{(\delta1+\delta2)/(2\cdot P1)\}\cdot|\beta1| < 30 \quad (3)$$

where, when, among rays that reach the center of the screen of the screen surface from the center of the screen of the display device surface, a ray passing through the center of the aperture is referred to as a "pupil center ray", and the length of a normal falling perpendicularly on the screen surface from an intersection between a reflective surface that is located closest to the screen among the reflective surfaces having an optical power and the pupil center ray is the projection distance, P1 represents the projection distance when the absolute value of the projection magnification is the highest during focus adjustment, δ1 represents, when the absolute value of the projection magnification is the highest during focus adjustment, the absolute value of a difference between a distance from the exit pupil of rays incident on the ends of the upper side of the screen of the screen surface to the screen surface and a distance from the exit pupil of rays incident on the ends of the lower side of the screen of the screen surface to the screen surface, and δ2 represents, when the absolute value of the projection magnification is the lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

According to a sixth aspect of the invention, there is provided a projection optical system that embodies any one of the first to fifth aspects of the invention and that satisfies conditional formula (4):

$$160 < (x1/P1)\cdot|\beta1| < 500 \quad (4)$$

where, when among rays that reach the center of the screen of the screen surface from the center of the screen of the display device surface, a ray passing through the center of an aperture is referred to as a "pupil center ray", and the length of a normal falling perpendicularly on the screen surface from an intersection between a reflective surface that is located closest to the screen among the reflective surfaces having an optical power and the pupil center ray is the projection distance, P1 represents the projection distance when the absolute value of the projection magnification is the highest during focus adjustment, and x1 represents a half value of the width of the screen in the x-direction on the screen surface when the absolute value of the projection magnification is the highest during focus adjustment.

According to a seventh aspect of the invention, there is provided a projection optical system that embodies any one of the first to sixth aspects of the invention and that satisfies conditional formula (5):

$$-0.02 < \{(\delta 1 - \delta 2)\beta 2\}/\{(\delta 1 + \delta 2)\beta 1\} < 0.2 \quad (5)$$

where
- δ1 represents, when the absolute value of the projection magnification is the highest during focus adjustment, the absolute value of a difference between a distance from the exit pupil of rays incident on the ends of the upper side of the screen of the screen surface to the screen surface and a distance from the exit pupil of rays incident on the ends of the lower side of the screen of the screen surface to the screen surface, and
- δ2 represents, when the absolute value of the projection magnification is the lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

According to an eighth aspect of the invention, there is provided a projection optical system that embodies any one of the first to seventh aspects of the invention and that includes at least one refractive optical device having an optical power.

According to a ninth aspect of the invention, there is provided a projection optical system that embodies any one of the first to eighth aspects of the invention and in which the rotationally symmetrical axes of at least two optical devices coincide.

According to a tenth aspect of the invention, there is provided a projection optical system that embodies any one of the first to ninth aspects of the invention and in which at least one reflective surface is moved in the focus adjustment.

According to an eleventh aspect of the invention, there is provided a projection optical system that embodies any one of the first to tenth aspects of the invention and in which at least one refractive optical device is moved in the focus adjustment.

According to a twelfth aspect of the invention, there is provided a projection image display apparatus that includes a display device forming a two-dimensional image and a projection optical system enlarging and projecting an image on a display device surface thereof onto a screen surface, the projection optical system being the projection optical system that embodies any one of the first to eleventh aspects of the invention.

Advantages of the Invention

According to the present invention, one or more reflective surfaces having an optical power are included and this makes it possible not only to increase the size of a screen but also to decrease a projection distance, and a focus mechanism is incorporated and this makes it possible to obtain a satisfactory projected image at an appropriate projection distance. Focus performed under predetermined conditions allows trapezoidal distortion produced when a projection distance is varied to be satisfactorily corrected. Thus, it is possible to provide a projection optical system that maintains high optical performance, has a significantly decreased projection distance and achieves focus according to a distance to a screen and a projection display apparatus incorporating such a projection optical system.

BRIEF DESCRIPTION OF DRAWINGS

FIG. 3 Distortion diagrams of Example 1;

FIG. 6 Distortion diagrams of Example 2;

FIG. 9 Distortion diagrams of Example 3;

FIG. 15 Distortion diagrams of Example 5;

FIG. 18 Distortion diagrams of Example 6;

FIG. 19 Schematic diagrams showing the difference between the position of the exit pupil of rays incident on the screen upper ends of a screen surface and the position of the exit pupil of rays incident on the screen lower ends of the screen surface;

FIG. 21 Schematic diagrams showing trapezoidal distortion produced when the projection distance is varied;

FIG. 22 Schematic diagrams showing how trapezoidal distortion is corrected by varying an angle of incidence; and FIG. 23 Schematic diagrams showing how trapezoidal distortion is corrected by moving an exit pupil.

LIST OF REFERENCE SYMBOLS

Figure 1:
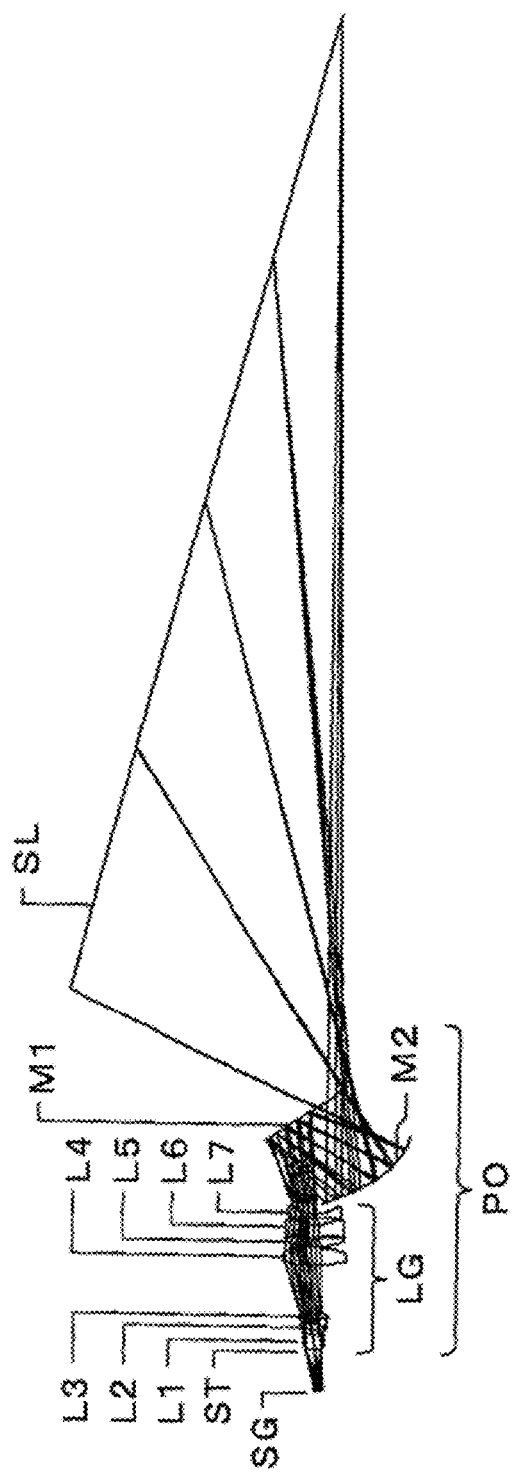
FIG. 1 A ray diagram showing the optical construction of a first embodiment (Example 1)
Figure 2:
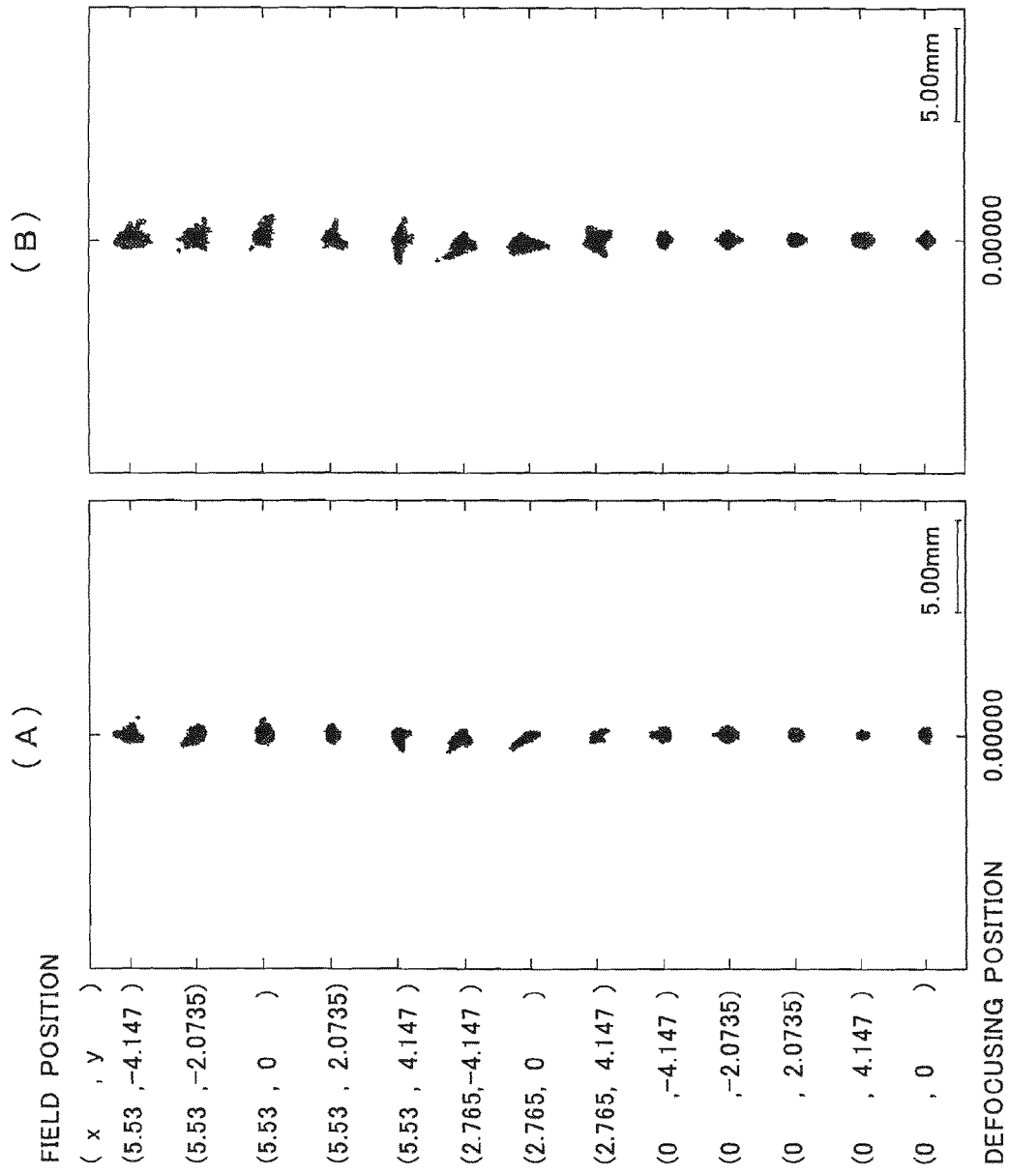
FIG. 2 Spot diagrams of Example 1.
Figure 4:
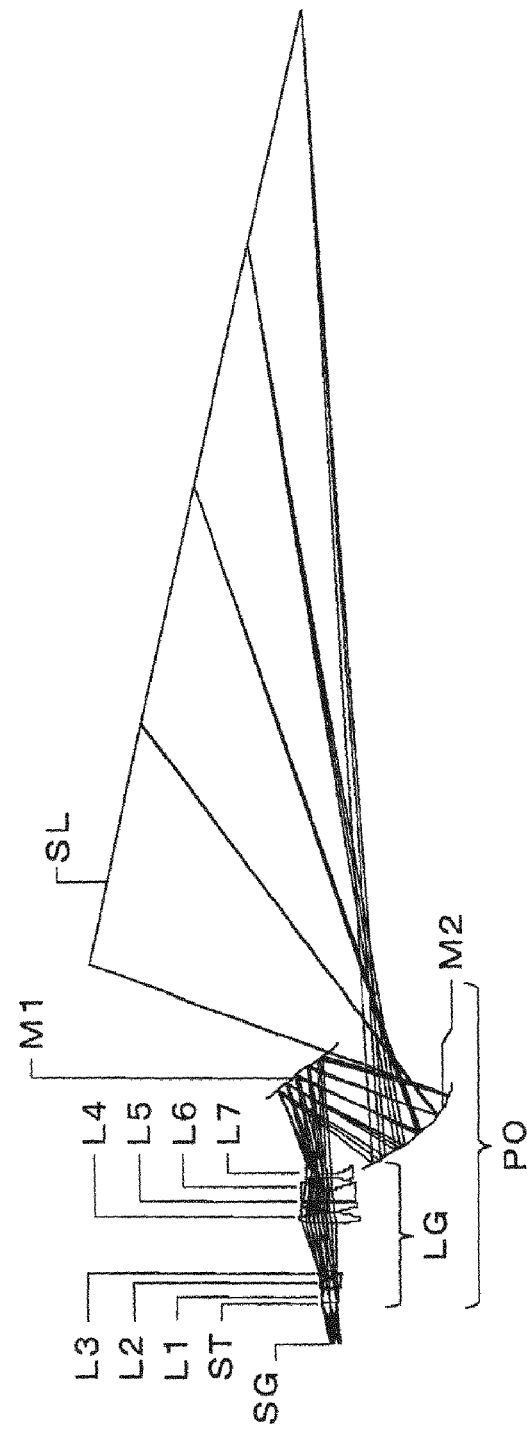
FIG. 4 A ray diagram showing the optical construction of a second embodiment (Example 2)
Figure 5:
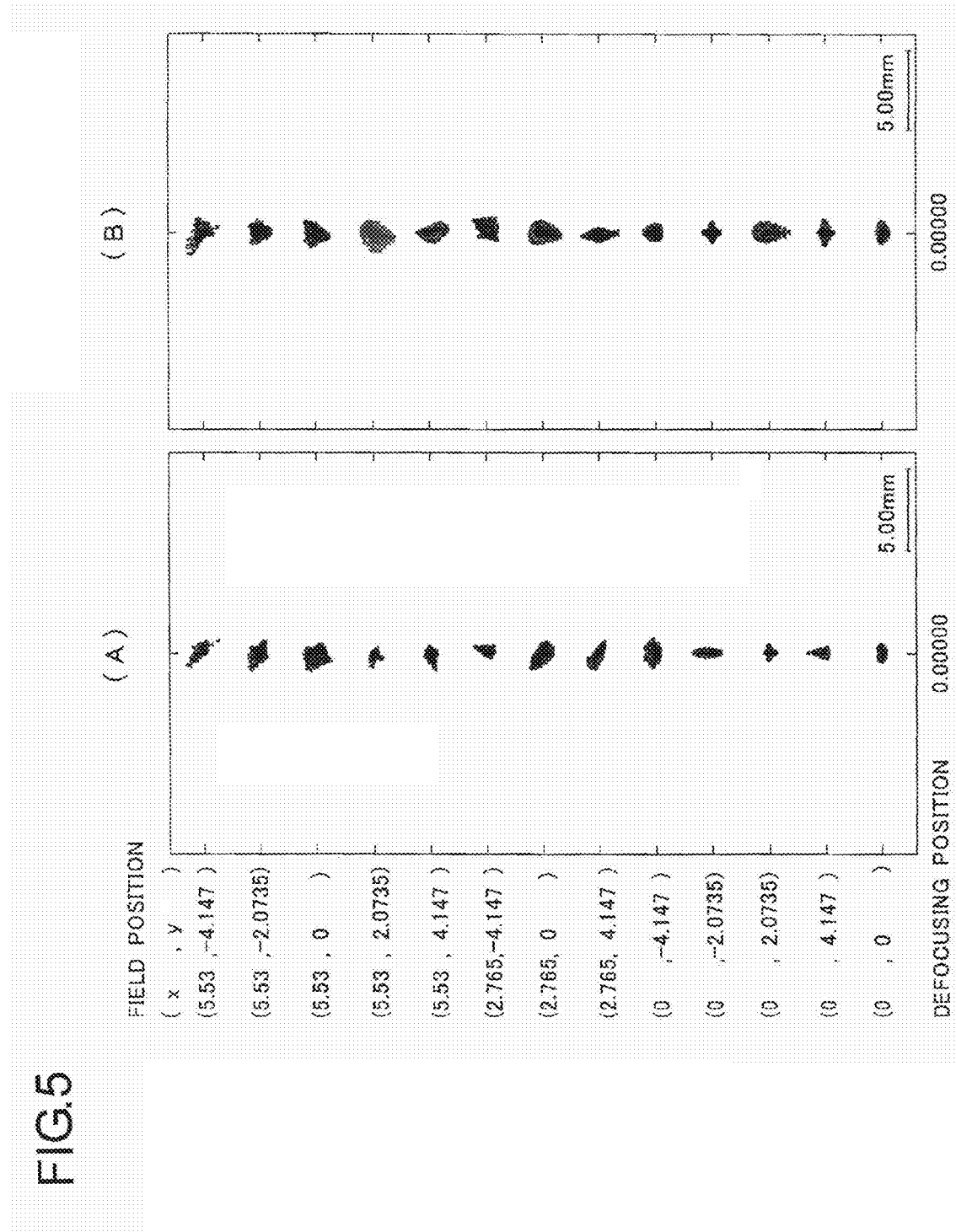
FIG. 5 Spot diagrams of Example 2.
Figure 7:
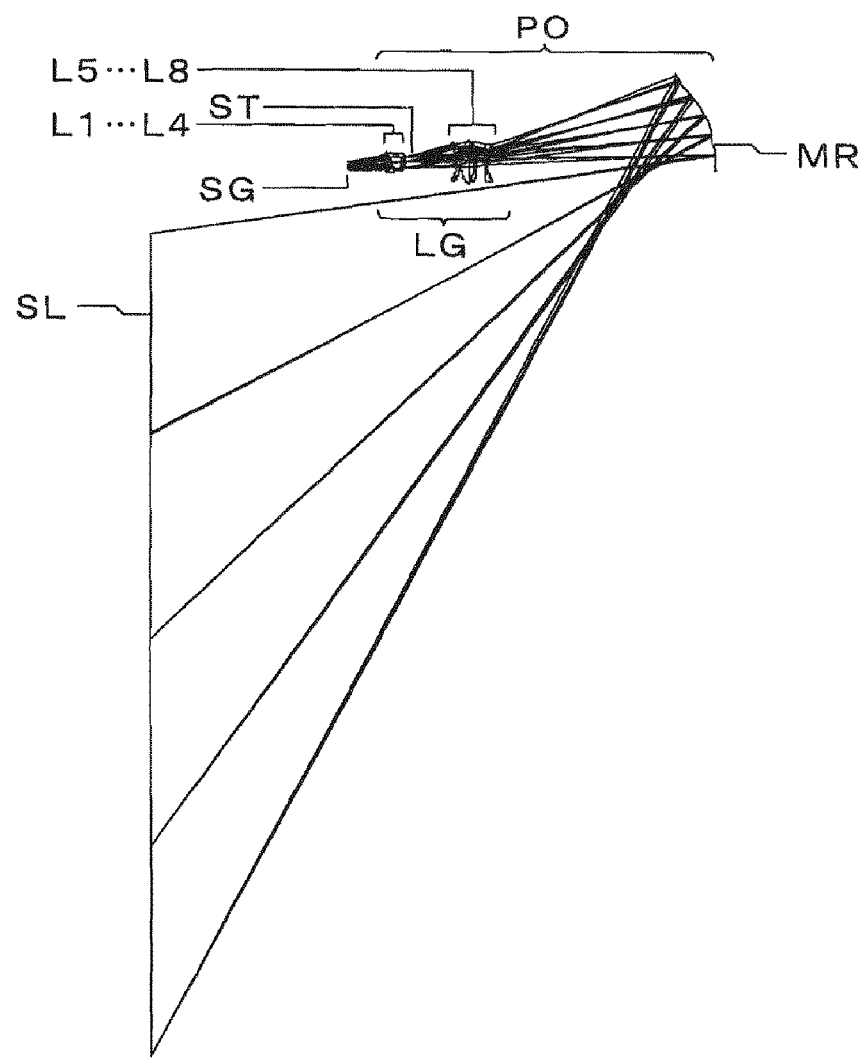
FIG. 7 A ray diagram showing the optical construction of a third embodiment (Example 3)
Figure 8:
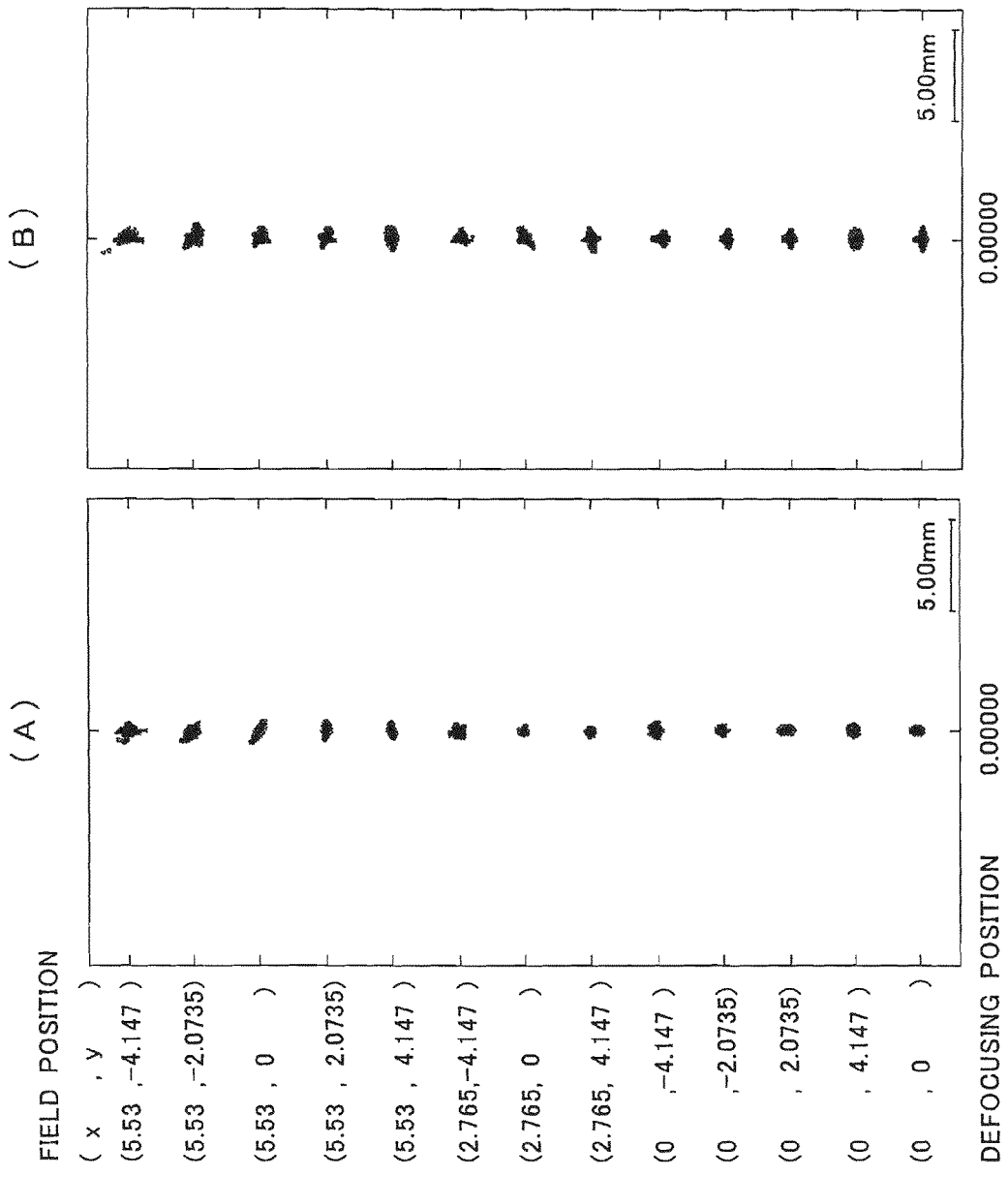
FIG. 8 Spot diagrams of Example 3.
Figure 10:
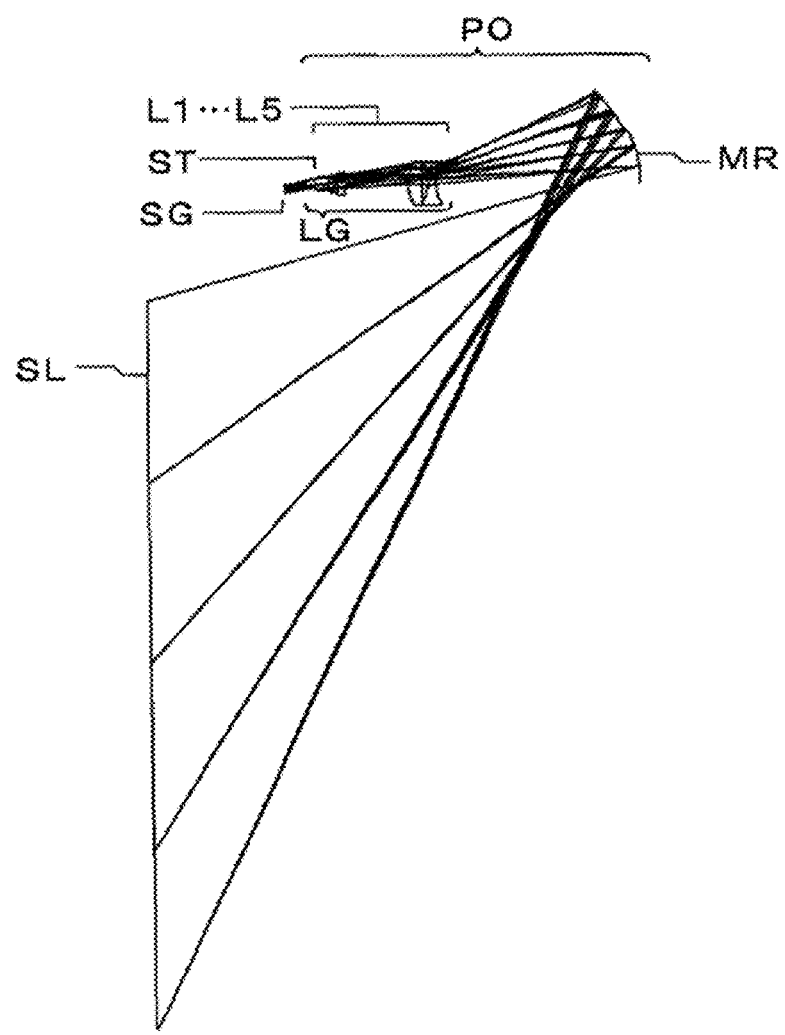
FIG. 10 A ray diagram showing the optical construction of a fourth embodiment (Example 4)
Figure 11:
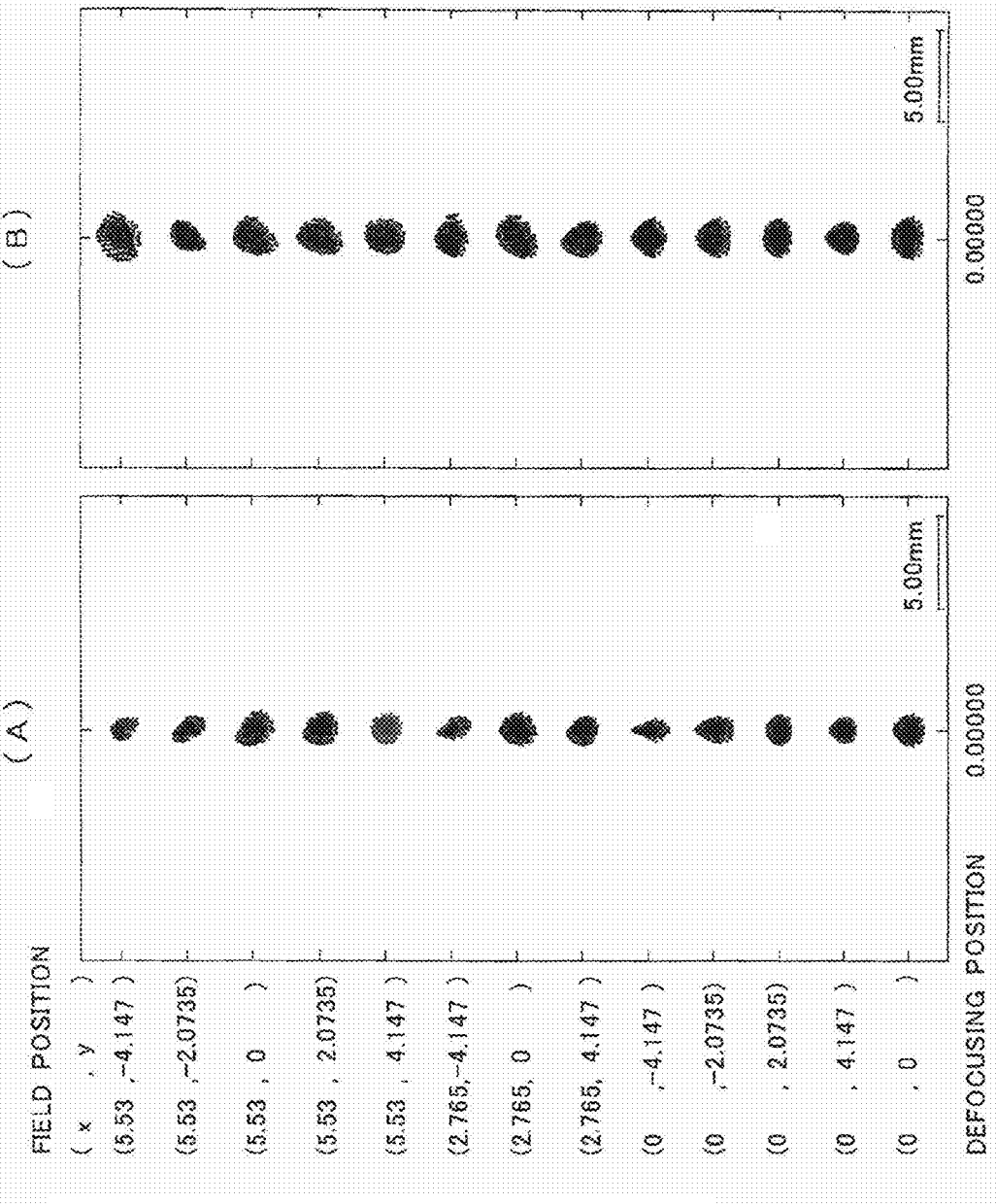
FIG. 11 Spot diagrams of Example 4.
Figure 12:
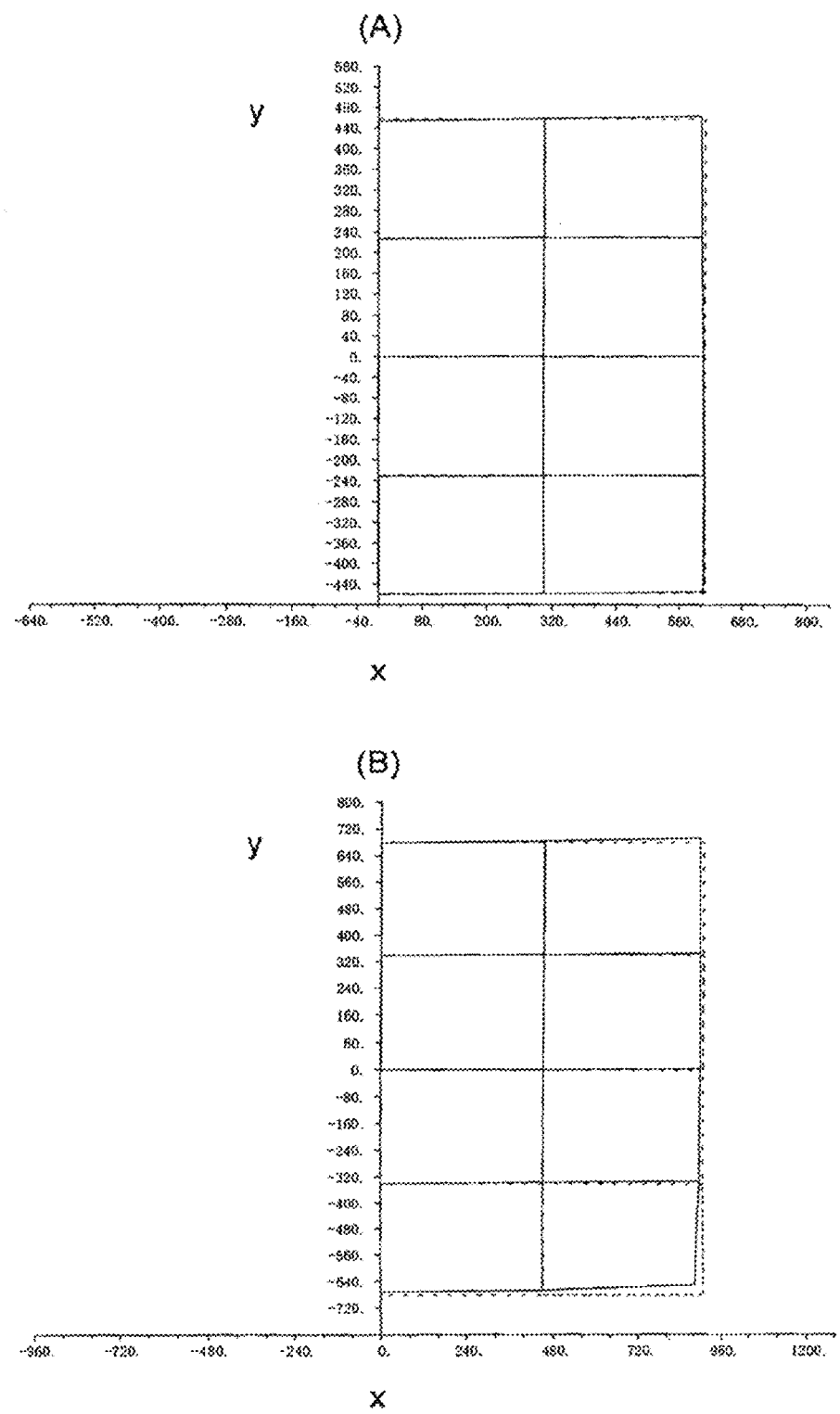
FIG. 12 Distortion diagrams of Example 4.
Figure 13:
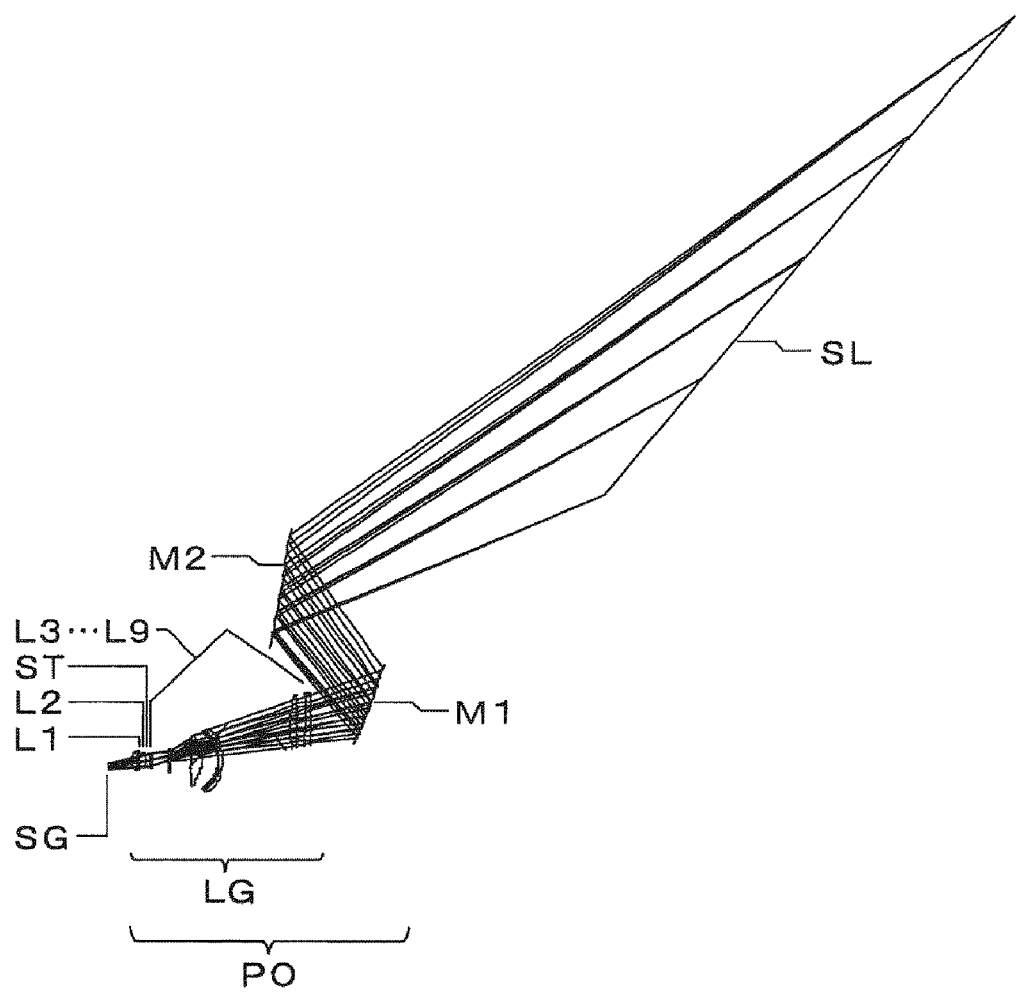
FIG. 13 A ray diagram showing the optical construction of a fifth embodiment (Example 5)
Figure 14:
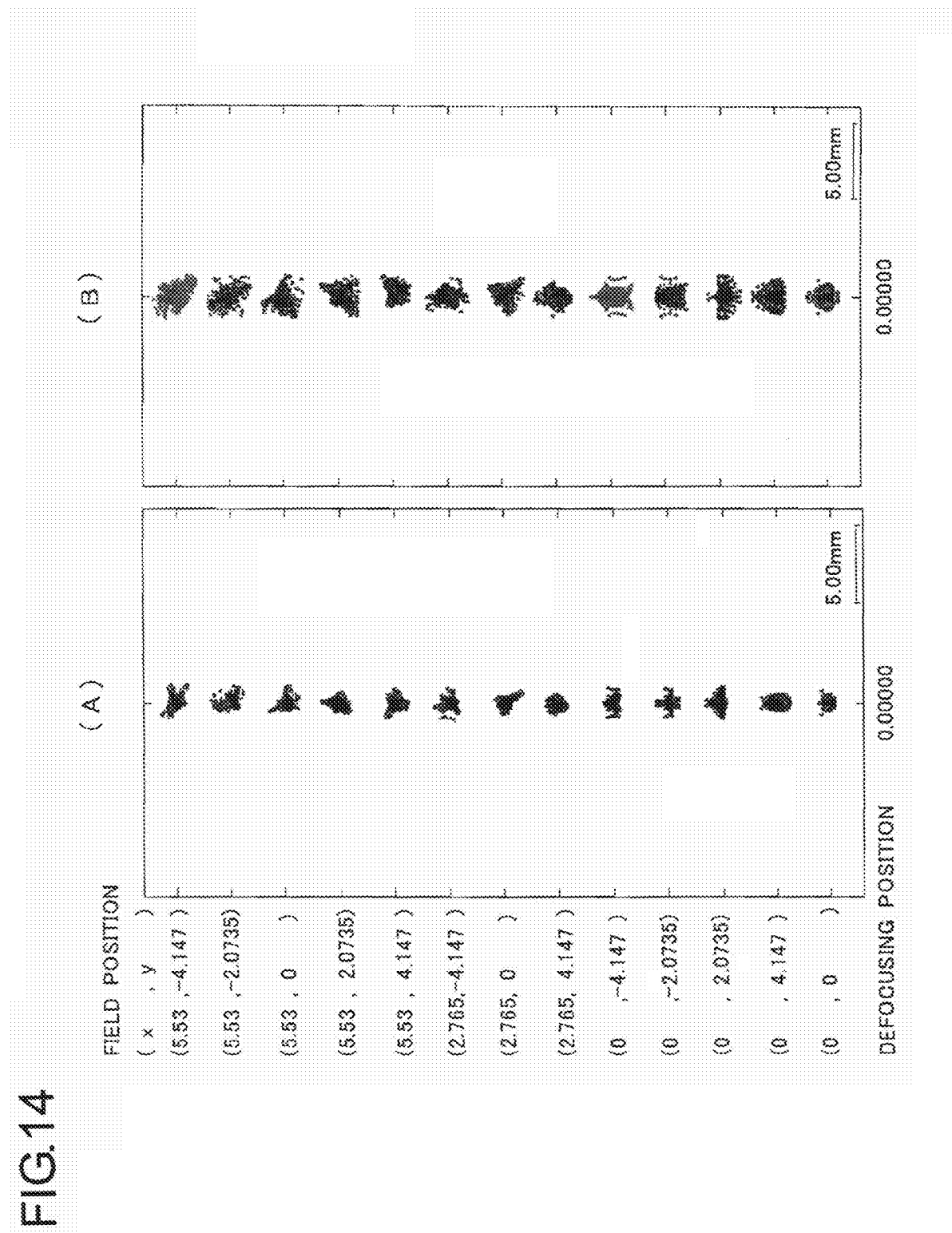
FIG. 14 Spot diagrams of Example 5.
Figure 16:
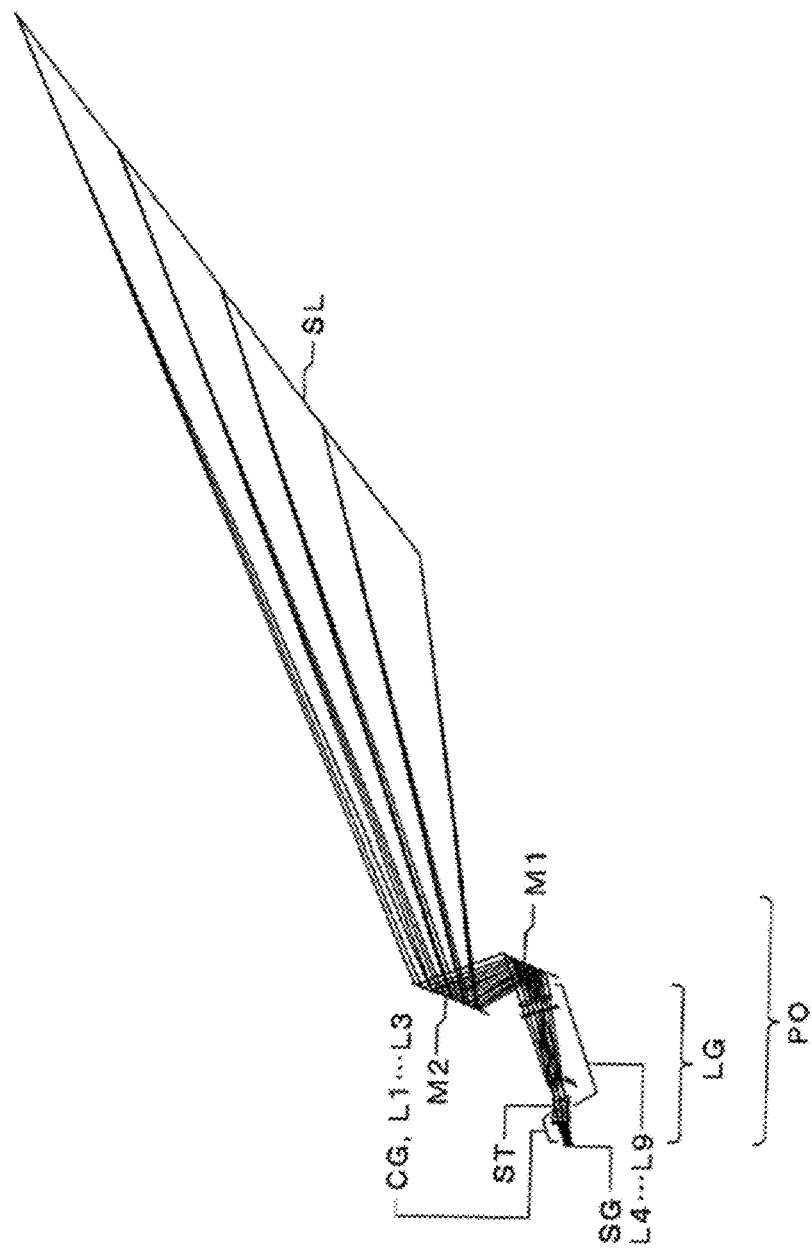
FIG. 16 A ray diagram showing the optical construction of a sixth embodiment (Example 6)
Figure 17:
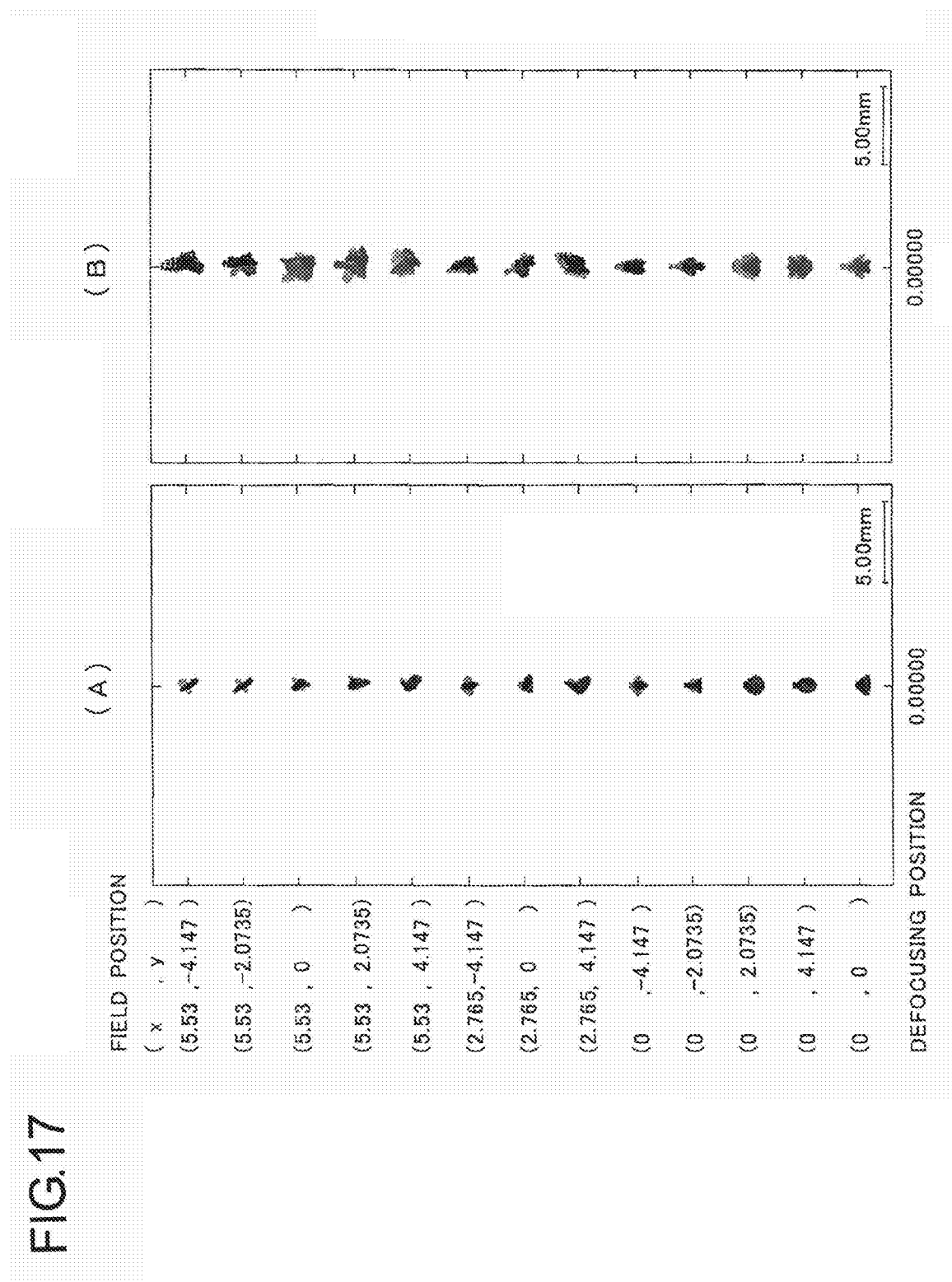
FIG. 17 Spot diagrams of Example 6.

SG Display device surface
SL Screen surface
SLx Long side of the screen of the screen surface
SLy Short side of the screen of the screen surface
IM Projected image
SR Reflective surface having an optical power
PO Projection optical system
MR Curved mirror (reflective surface having an optical power)
MI First curved mirror (reflective surface having an optical power)
M2 Second curved mirror (reflective surface having an optical power)
LG Refractive optical system (refractive optical device)
L1 to L9 First to ninth lenses (refractive optical devices)
ST Aperture

BEST MODE FOR CARRYING OUT THE INVENTION

Embodiments and the like of a projection optical system according to the present invention will be described below with reference to the accompanying drawings. The projection optical system of the invention receives light from a display device surface and enlarges and projects a display image thereon onto a screen surface, and varies a projection distance to a screen to display images of different projection magnifications. The projection optical system includes one or more reflective surfaces having an optical power between the display device surface and the screen surface, and moves at least one optical device having an optical power to adjust focus. As described above, as the viewing angle of a projection optical system is increased and this increases the angle of incidence of rays with respect to a screen surface, the difference between the length of the optical path of rays incident on the ends of the upper side of the screen of the screen surface (hereinafter also referred to as "screen upper ends") and the length of the optical path of rays incident on the ends of the lower side of the screen of the screen surface (hereinafter also referred to as "screen lower ends") is increased. Consequently, when a projection distance is varied, trapezoidal distortion is significantly produced, and it is thus necessary to correct the trapezoidal distortion simultaneously when focus is adjusted. The projection optical system of the invention can satisfactorily correct trapezoidal distortion produced when a projection distance is varied; the construction thereof will be specifically described with reference to FIGS. 19 to 23.

When the screen of the display device surface is rectangular in shape, as shown in FIG. 19, a rectangular projected image (screen) IM is formed on the screen surface SL. FIG. 19(A) is a perspective view showing optical paths toward the screen surface SL. Broken lines represent the optical path of rays incident on the screen upper ends of the screen surface SL; dashed-dotted lines represent the optical path of rays incident on the screen lower ends of the screen surface SL. The direction of a normal to the screen of the screen surface SL is referred to as a "z-direction"; the direction of a long side of the screen of the screen surface SL is referred to as an "x-direction"; and the direction of a short side of the screen of the screen surface SL is referred to as a "y-direction." Thus, the optical paths from the reflective surface SR to the projected image IM are constructed, in y-z cross section, as shown in FIG. 19(B), and the optical paths from the reflective surface SR to the projected image IM are constructed, in x-z cross section, as shown in FIG. 19(C). The reflective surface SR is located closest to the image in the projection optical system; it is a reflective surface that has an optical power. In the projected image IM, the symbol SLx represents the long side of the screen, and the symbol SLy represents the short side of the screen.

In FIG. 19, the symbol Pu represents the exit pupil of rays incident on the screen upper ends of the screen surface SL, and the symbol Pd represents the exit pupil of rays incident on the screen lower ends of the screen surface SL. Hence, the position of an exit pupil varies depending on the height of an image. Among rays that reach the center of the screen of the screen surface SL from the center of the screen of the display device surface, a ray (corresponding to a chief ray in a typical optical system) passing through the center of an aperture is referred to as a "pupil center ray", and then the centers of the exit pupils Pu and Pd are located on a plane (that is, the y-z plane) that includes the pupil center ray incident on the screen surface SL and that is perpendicular to the screen surface SL (in other words, the projected image IM). Thus, the position of the exit pupil Pu coincides with the position at which rays that pass through the center of the aperture and that are incident on the screen upper ends of the screen surface SL intersect with the y-z plane; the position of the exit pupil Pd coincides with the position at which rays that pass through the center of the aperture and that are incident on the screen lower ends of the screen surface SL intersect with the y-z plane.

Figure 20:
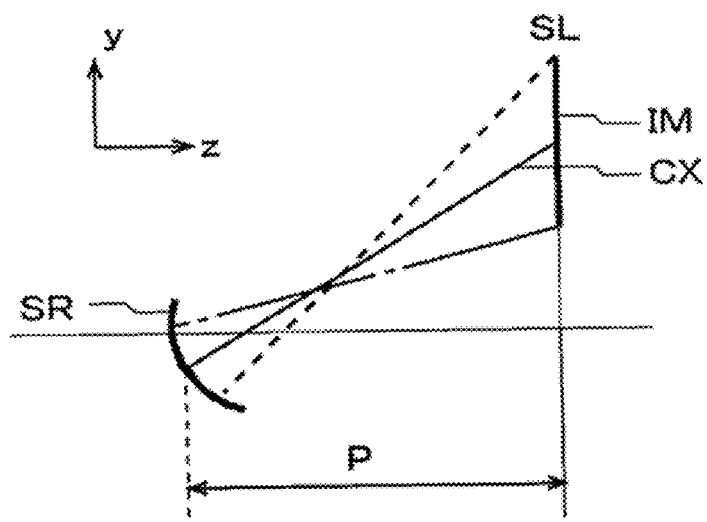
FIG. 20 A schematic diagram showing a projection distance.

The difference between the distance from the position of the exit pupil Pu to the screen surface SL and the distance from the position of the exit pupil Pd to the screen surface SL is equal to a distance δ from the position of the exit pupil Pu to the position of the exit pupil Pd. Hence, with respect to the distances between the screen surface SL and the exit pupils Pu and Pd, as shown in FIG. 19(C), the z-direction components of the distances from the exit pupils Pu and Pd to the screen surface SL are only considered. In FIG. 20, a pupil center ray CX on the y-z plane is shown. The projection distance P is the length of a straight line that falls perpendicularly on the screen surface SL from the intersection between the pupil center ray CX and the reflective surface SR. Hence, likewise, z-direction components of the projection distance P are only considered. The projection magnification is assumed to be the average of a projection magnification βx in the direction (x-direction) of the long side of the screen of the display device surface and a projection magnification βy in the direction (y-direction) of the short side of the screen of the display device surface.

When a projection space is reduced in the projection optical system, the difference between the distance of the optical path of rays incident on the upper side of the screen of the screen surface SL and the distance of the optical path of rays incident on the lower side of the screen of the screen surface SL is increased. This makes it difficult to make the positions of the exit pupils Pu and Pd substantially coincide throughout the screen of the screen surface while maintaining the optical performance. Specifically, this makes it difficult to reduce an exit pupil-to-exit pupil distance δ shown in FIG. 19(C). In order to obtain a satisfactory image on the screen surface SL, by use of rays that pass through the center of the exit pupil Pu and that are incident on the ends of the upper side of the screen of the screen surface SL and rays that pass through the center of the exit pupil Pd and that are incident on the ends of the lower side of the screen of the screen surface SL, it is necessary to vary the x-z plane component of the angle of incidence with respect to the screen surface SL.

However, when the x-z plane component of the angle of incidence of rays passing through the pupil center with respect to the screen surface SL differ depending on the height of an image on the screen surface SL, even if a satisfactory image is obtained at a specific projection distance, the variation of the projection distance P causes trapezoidal distortion. For example, in a case where a construction shown in FIG. 21(A) is used for projection, a projected image IM2 obtained at a projection distance P2 undergoes no trapezoidal distortion (because broken lines and dashed-dotted lines intersect on the screen surface SL), whereas a projected image IM1 obtained at a projection distance P1 undergoes trapezoidal distortion (because, on the screen surface SL, the width of a screen indicated by the broken lines is greater than that of a screen indicated by the dashed-dotted lines). Specifically, at the projection distance P2, the projected image IM2 without trapezoidal distortion is obtained as shown in FIG. 21(B), whereas, at the projection distance P1, the projected image IM1 is obtained whose width becomes greater toward its upper side due to trapezoidal distortion as shown in FIG. 21(C). As the projection distance P is increased, the trapezoidal distortion becomes larger.

When a projection optical system has a shorter projection distance P, it is necessary not only to focus on a position of the screen surface SL when focus is achieved but also to correct trapezoidal distortion corresponding to the projection distance P. In order to correct trapezoidal distortion produced when the projection distance P is varied, it is necessary to vary, when focus is achieved, the x-z components of the angles of incidence of rays with respect to the ends of the upper and lower sides of the screen of the screen surface SL. Trapezoidal distortion can be corrected either electrically or optically; when it is corrected electrically, an image on the screen is more likely to be degraded. As will be described below, the projection optical system of the present invention employs a method of correcting trapezoidal distortion optically.

The direction of a normal to the screen of the screen surface is referred to as a "z-direction", the direction of a long side of the screen of the screen surface is referred to as an "x-direction" and the x-z plane component of the angle of incidence with respect to the screen surface is referred to as an "incident angle θ (°)". As shown in FIG. 19(C), among rays that pass through the center of the aperture and that are incident on the ends of the upper and lower sides of the screen of the screen surface SL, the incident angle θ of rays whose incident angle θ is larger is referred to as "θf", and the incident angle θ of rays whose incident angle θ is smaller is referred to as "θn". Since the incident angles θf and θn of rays incident on the left and right ends of the screen of the screen SL depend largely on the projection distance P, at least one of the incident angles θf and θn is varied when focus is achieved. Thus, it is possible not only to increase the size of the screen but also to decrease the projection distance, and to satisfactorily correct trapezoidal distortion produced when the projection distance is varied.

For example, consider a case where the projection distance is increased from P2 to P1 as shown in FIG. 21(A). When a focus operation is performed, as shown in FIG. 22(A), the larger one of incident angles θ with respect to the screen surface SL is decreased, or, as shown in FIG. 22(B), the smaller one of the incident angles θ with respect to the screen surface SL is increased. When the incident angle θ is varied in this way, trapezoidal distortion is reduced (because the difference between the width of a screen indicated by the dashed-dotted lines and the width of a screen indicated by the broken lines is reduced on the screen surface SL), and this allows the trapezoidal distortion of the projected image IM1 to be corrected. In a case where the projection distance P is decreased, in contrast to the above case, when a focus operation is performed, the larger one of the incident angles θ with respect to the screen surface SL is increased, or the smaller one of the incident angles θ with respect to the screen surface SL is decreased. Thus, it is possible to correct the trapezoidal distortion of the projected image. Preferably, since the absolute value of the projection magnification β increases with the projection distance P, as the absolute value of the projection magnification β is increased, the incident angle θ of rays whose incident angle θ is larger is decreased, or the incident angle θ of rays whose incident angle θ is smaller is increased, whereas, as the absolute value of the projection magnification β is decreased, the incident angle θ of rays whose incident angle θ is larger is increased, or the incident angle θ of rays whose incident angle θ is smaller is decreased.

From the above viewpoint, in a projection optical system that has at least one reflective surface as an optical surface having an optical power and that moves at least one optical device having an optical power to adjust focus, by varying, when focus is achieved, at least one of the incident angles θf and θn, it is possible not only to increase the size of the screen but also to decrease a projection distance and to satisfactorily correct trapezoidal distortion produced when the projection distance is varied. A description will be given below of desired conditions for achieving further enhanced performance, compactness and the like in a construction in which trapezoidal distortion is optically corrected as described above and other effective constructions.

From the viewpoint of varying the angle of incidence with respect to the screen surface SL to correct trapezoidal distortion, a projection optical system preferably satisfies conditional formula (1) below:

$$0.01 < \{(\tan \theta f1 - \tan \theta f2) - (\tan \theta n1 - \tan \theta n2)\} \cdot (\beta 2/\beta 1) < 0.20 \quad (1)$$

where, when the screen of a display device surface is rectangular in shape, the direction of a normal to the screen of a screen surface is referred to as a "z-direction", the direction of a long side of the screen of the screen surface is referred to as an "x-direction", the x-z plane component of the angle of incidence with respect to the screen surface is referred to as an "incident angle θ °)" and among rays that pass through the center of an aperture and that are incident on the ends of the upper and lower sides of the screen of the screen surface, the incident angle θ of rays whose incident angle θ is larger is referred to as "θf" and the incident angle θ of rays whose incident angle θ is smaller is referred to as "θn", θf1 represents, when the absolute value of a projection magnification is the highest during focus adjustment, the incident angle θf, θf2 represents, when the absolute value of the projection magnification is the lowest during focus adjustment, the incident angle θf, θn1 represents, when the absolute value of the projection magnification is the highest during focus adjustment, the incident angle θn, θn2 represents, when the absolute value of the projection magnification is the lowest during focus adjustment, the incident angle θn, β1 represents the maximum value of the projection magnification when focus is adjusted (except that β1 represents, if the projection magnification is negative, a value of the projection magnification when the absolute value thereof is the highest) and β2 represents the minimum value of the projection magnification when focus is adjusted (except that β2 represents, if the projection magnification is negative, a value of the projection magnification when the absolute value thereof is the lowest).

Conditional formula (1) specifies a range of conditions, which is suitable for correcting trapezoidal distortion, for the amounts of variation of the incident angles θf and θn of rays, when focus is adjusted, that pass through the pupil center and are then incident on the ends of the upper and lower sides of the screen of the screen surface. In the case of the lower limit of conditional formula (1) being violated, when, during focus adjustment, the projection distance varies with the projection magnification, the incident angles θf and θn of the rays that pass through the pupil center and are then incident on the ends of the upper and lower sides of the screen of the screen surface are not sufficiently varied during focus adjustment. Hence, in order to maintain the optical performance, it is necessary to make the positions of the exit pupils coincide in each height on the screen surface. Thus, it is impossible to sufficiently achieve size reduction. In the case of the upper limit of conditional formula (1) being violated, when the projection distance is varied, the incident angles θf and θn of the rays that pass through the pupil center and are then incident on the ends of the upper and lower sides of the screen of the screen surface are excessively varied during focus adjustment. Therefore, trapezoidal distortion produced when the projection distance is varied is overcorrected, with the result that trapezoidal distortion produced when the incident angles are varied needs to be corrected by other correction means.

In a projection optical system provided with a reflective surface having an optical power, the minimum screen size (when the absolute value of a projection magnification is the lowest) and the maximum screen size (when the absolute value of the projection magnification is the highest) are limited by the optical performance of the projection optical system. That is, since the projection optical system focuses on a finite distance, a focus range that can satisfy optical performance requirements (field curvature and the like) is limited. The values β1 and β2 described above are determined from this viewpoint.

More preferably, conditional formula (1a) below is satisfied:

$$0.02<\{(\tan\theta f1-\tan\theta f2)-(\tan\theta n1-\tan\theta n2)\}\cdot(\beta 2/\beta 1)<0.15 \quad (1a)$$

Conditional formula (1a) mentioned above specifies a further desired range of conditions within the range of conditions specified by conditional formula (1) described above. When conditional formula (1a) is satisfied, a satisfactory optical performance is maintained, and trapezoidal distortion can be more satisfactorily corrected without overcorrection and undercorrection. Thus, it is possible to obtain a further satisfactory projected image when a focus operation is performed. The use of conditional formulas (1) or (1a) as limiting conditions when a projection optical system is automatically designed can provide a projection optical system that practically satisfies conditional formulas (1) or (1a).

When a projection optical system is considered as a projector, the size of a commonly used projection screen approximately ranges from 60 inches to 100 inches. Thus, conditional formulas (1) or (1a) described above are preferably satisfied within the range of the ratio of β1 and β2 (β1/β2) corresponding to this screen size. From this viewpoint, conditional formulas (1) or (1a) described above are preferably satisfied within at least a range specified by the formula "$1.3 \leq \beta 1/\beta 2 \leq 1.8$". When formula (1) is satisfied at a predetermined value of the ratio of β1 and β2 (β1/β2), if the ratio of β1 and β2 is less than the predetermined value, formula (1) is always satisfied.

Preferably, conditional formula (2) below is satisfied:

$$38<\theta f<80 \quad (2)$$

Conditional formula (2) specifies a range of conditions suitable for reducing a projection space sufficiently. When the lower limit of conditional formula (2) is violated, it is impossible to sufficiently reduce the projection space. For example, when the projection distance is varied at a given projection magnification (when the size of the screen of a screen surface remains the same), it is necessary to secure a large projection space. When the upper limit of conditional formula (2) is violated, the angle of incidence of rays with respect to the screen surface is increased, and thus a smaller proportion of rays incident on the screen travels toward a viewer.

More preferably, conditional formula (2a) below is satisfied:

$$45<\theta f<70 \quad (2a)$$

Conditional formula (2a) mentioned above specifies a further desired range of conditions within the range of conditions specified by conditional formula (2) described above. When the lower limit of conditional formula (2a) is exceeded, a projection space can be more reduced. When the upper limit of conditional formula (2a) is not exceeded, an appropriate number of rays that are incident on a screen surface and that then travel toward a viewer can be secured.

The distance from the exit pupil of rays that are incident on a screen at the incident angle θf to the screen is preferably shorter than that from the exit pupil of rays that are incident on the screen at the incident angle θn to the screen. In an oblique projection optical system, since the length of the optical path of rays incident on screen upper ends (rays incident at the incident angle θf) is longer than that of the optical path of rays incident on screen lower ends (rays incident at the incident angle θn), field curvature is produced greatly. The position of the exit pupil of rays incident on the screen upper ends is brought close to the screen as compared with the position of the exit pupil of rays incident on the screen lower ends, and thus the difference in the length of the optical path from the position of the exit pupil to the screen between the upper and lower portions of the screen is reduced, with the result that field curvature is easily corrected.

Preferably, conditional formula (3) below is satisfied:

$$1<\{(\delta 1+\delta 2)/(2\cdot P1)\}\cdot|\beta 1|<30 \quad (3)$$

where, when, among rays that reach the center of the screen of a screen surface from the center of the screen of a display device surface, a ray passing through the center of an aperture is referred to as a "pupil center ray", and the length of a normal falling perpendicularly on the screen surface from the intersection between a reflective surface that is located closest to the screen, among reflective surfaces having an optical power and the pupil center ray is assumed to be a projection distance, P1 represents the projection distance when the absolute value of a projection magnification is the highest during focus adjustment.

δ1 represents, when the absolute value of the projection magnification is the highest during focus adjustment, the absolute value of a difference between a distance from the exit pupil of rays incident on the screen upper ends of the screen surface to the screen surface and a distance from the exit pupil of rays incident on the screen lower ends of the screen surface to the screen surface, and δ2 represents, when the absolute value of the projection magnification is the lowest during focus adjustment, the absolute value of the difference between the distance from the exit pupil of rays incident on the screen upper ends of the screen surface to the screen surface and the distance from the exit pupil of rays incident on the screen lower ends of the screen surface to the screen surface.

Conditional formula (3) specifies a range of conditions suitable for satisfactorily correcting trapezoidal distortion produced when the projection distance is varied in a projection optical system having a reflective surface and an extremely small projection space. When the lower limit of conditional formula (3) is violated, the difference between the position of the exit pupil of rays incident on the screen upper ends of the screen surface and the position of the exit pupil of rays incident on the screen lower ends of the screen surface is reduced. This makes it difficult to correct field curvature. When the upper limit of conditional formula (3) is violated, the difference between the position of the exit pupil of rays incident on the screen upper ends of the screen surface and the position of the exit pupil of rays incident on the screen lower ends of the screen surface is increased. This makes it difficult to correct field curvature when focus is achieved.

Preferably, conditional formula (4) below is satisfied:

$$160<(x1/P1)\cdot|\beta 1|<500 \quad (4)$$

where, when, among rays that reach the center of the screen of a screen surface from the center of the screen of a display device surface, a ray passing through the center of an aperture is referred to as a "pupil center ray" and the length of a normal falling perpendicularly on the screen surface from the intersection between a reflective surface that is located closest to the screen among reflective surfaces having an optical power and the pupil center ray is assumed to be a projection distance, P1 represents the projection distance when the absolute value of a projection magnification is the highest during focus adjustment, and x1 represents the half value of the width of the screen in the x-direction on the screen surface when the absolute value of the projection magnification is the highest during focus adjustment.

Conditional formula (4) specifies a range of conditions suitable for reducing a projection space. When the lower limit of conditional formula (4) is violated, it is impossible to sufficiently achieve the reduction of the projection space. When the upper limit of conditional formula (4) is violated, since the angle of incidence of rays with respect to the screen surface is extremely increased, a smaller proportion of rays incident on the screen surface travels toward a viewer.

In order to correct trapezoidal distortion produced when a projection distance is varied, it is possible to utilize the variation of the positions of the exit pupils of rays incident on the upper and lower sides of the screen of the screen surface. Specifically, by moving, when focus is adjusted, at least one of the exit pupil of rays incident on the screen upper ends of the screen surface and the exit pupil of rays incident on the screen lower ends of the screen surface, it is possible not only to increase the size of the screen but also to decrease the projection distance and to satisfactorily correct the trapezoidal distortion produced when the projection distance is varied. The combined use of the variation of incident angles and the variation of the positions of the exit pupils helps not only to correct trapezoidal distortion but also to maintain the optical performance.

For example, consider a case where the projection distance is increased from P2 to P1 as shown in FIG. 21(A). When a focus operation is performed, as shown in FIG. 23(A), the position of the exit pupil Pu, which is closer to the screen surface SL, is moved toward the screen surface SL, or, as shown in FIG. 23(B), the position of the exit pupil Pd, which is farther away from the screen surface SL, is moved away from the screen surface SL. When the position of the exit pupil is varied in this way, trapezoidal distortion is reduced (because the difference between the width of a screen indicated by the dashed-dotted lines and the width of a screen indicated by the broken lines is reduced on the screen surface SL), and this allows the trapezoidal distortion of the projected image IM1 to be corrected. In a case where the projection distance P is decreased, in contrast to the above case, when a focus operation is performed, the position of the exit pupil Pu, which is closer to the screen surface SL, is moved away from the screen surface SL, or the position of the exit pupil Pd, which is farther away from the screen surface SL, is moved toward the screen surface SL. Thus, it is possible to correct the trapezoidal distortion of the projected image. Hence, as the projection distance P is increased, the exit pupil-to-exit pupil distance is preferably increased, whereas, as the projection distance P is decreased, the exit pupil-to-exit pupil distance is preferably decreased. Moreover, as the projection distance P is increased, the absolute value of a projection magnification β becomes higher, and thus as the absolute value of the projection magnification β becomes higher, the exit pupil-to-exit pupil distance is preferably increased; in contrast, as the absolute value of the projection magnification β becomes lower, the exit pupil-to-exit pupil distance is preferably decreased.

From the above viewpoint, in a projection optical system that has at least one reflective surface as an optical surface having an optical power and that moves at least one optical device having an optical power to adjust focus, by moving, when focus is achieved, at least one of the exit pupil of rays incident on the screen upper ends of a screen surface and the exit pupil of rays incident on the screen lower ends of the screen surface, it is possible not only to increase the size of the screen but also to decrease a projection distance and to satisfactorily correct trapezoidal distortion produced when the projection distance is varied.

From the viewpoint of moving an exit pupil to correct trapezoidal distortion, a projection optical system preferably satisfies conditional formula (5) below:

$$-0.02 < \{(\delta 1 - \delta 2)\beta 2\} / \{(\delta 1 + \delta 2)\beta 1\} < 0.2 \quad (5)$$

where $\delta 1$ represents, when the absolute value of a projection magnification is the highest during focus adjustment, the absolute value of a difference between a distance from the exit pupil of rays incident on the screen upper ends of a screen surface to the screen surface and a distance from the exit pupil of rays incident on the screen lower ends of the screen surface to the screen surface, and $\delta 2$ represents, when the absolute value of the projection magnification is the lowest during focus adjustment, the absolute value of the difference between the distance from the exit pupil of rays incident on the screen upper ends of the screen surface to the screen surface and the distance from the exit pupil of rays incident on the screen lower ends of the screen surface to the screen surface.

Conditional formula (5) specifies a range of conditions, which is suitable for correcting trapezoidal distortion, for the amount of variation of an exit pupil-to-exit pupil distance as the projection magnification is varied. In the case of the lower limit of conditional formula (5) being violated, if focus is adjusted when a projection distance is increased, the exit pupil-to-exit-pupil distance of rays incident on the screen upper and lower ends of the screen surface is decreased, with the result that trapezoidal distortion becomes worse. Hence, it is necessary to increase the amount of variation of the incident angle, and this results in increased optical burden. In the case of the upper limit of conditional formula (5) being violated, if focus is adjusted when the projection distance is increased, the exit pupil-to-exit pupil distance of rays incident on the screen upper and lower ends of the screen surface is increased. Consequently, the optical burden on the projection optical system is increased, and this makes it difficult to maintain a satisfactory optical performance.

More preferably, conditional formula (5a) below is satisfied:

$$0.0001 < \{(\delta 1 - \delta 2)\beta 2\} / \{(\delta 1 + \delta 2)\beta 1\} < 0.2 \quad (5a)$$

Conditional formula (5a) mentioned above specifies a further desired range of conditions within the range of conditions specified by conditional formula (5) described above. When conditional formula (5a) is satisfied, a satisfactory optical performance is maintained, and trapezoidal distortion can be more satisfactorily corrected without overcorrection and undercorrection. Thus, it is possible to obtain a further satisfactory projected image when a focus operation is performed.

A projection optical system preferably includes at least one refractive optical device having an optical power. With a refractive optical device having an optical power, it is possible to correct aberrations, such as a chromatic aberration produced by a color composition prism, that cannot be corrected by a reflective surface alone.

Preferably, in a projection optical system, the rotationally symmetrical axes of at least two optical devices coincide. The use of a coaxial optical construction facilitates the assembly of a projection optical system. For example, a projection optical system is provided with two or more refractive optical devices whose rotationally symmetrical axes coincide, and this facilitates the assembly and production of the projection optical system, with the result that cost reduction can be achieved.

A projection optical system preferably moves at least one reflective surface when focus is adjusted. With a construction in which at least a reflective surface is moved when focus is adjusted (specifically, a construction in which a reflective optical device is only moved or a construction in which a reflective optical device and a refractive optical device are moved), it is possible to reduce the amount of movement of the optical device necessary to achieve focus as compared with the case where a refractive optical device is only moved. With the construction in which at least a reflective surface is moved when focus is adjusted, it is possible to correct distortion of an image plane that is produced on the ends of the screen of a screen surface when focus is adjusted.

A projection optical system preferably moves at least one refractive optical device when focus is adjusted. Since a refractive optical device can be reduced in size as compared with a reflective optical device such as a mirror, it is possible to simplify a focus mechanism with a refractive optical device. Thus, with a simplified and small-sized focus mechanism, it is possible to satisfactorily correct aberrations.

From the above viewpoint, when focus is adjusted, a total of two optical devices, namely, one reflective optical device and one refractive optical device are preferably moved. Moreover, in order to reduce a projection space, it is preferable to move two or more optical devices when focus is adjusted. In an optical projection system having a reduced projection space, since, as described previously, the length of the optical path of rays incident on a screen surface greatly differs between the screen upper portion and the screen lower portion of the screen surface, it is necessary not only to focus on the center of the screen but also to correct the inclination of an image plane with respect to the screen surface when focus is adjusted. With a construction in which two or more optical devices are moved when focus is adjusted, since two or more optical devices can share functions for achieving focus and correcting the inclination of an image plane, it is possible to obtain satisfactory performance before and after focus is achieved.

One or two reflective surfaces are preferably provided between a display device surface and a screen surface. By folding an optical path with a reflective surface, it is possible to reduce the size of a projection optical system. By increasing the number of reflective surfaces, it is possible to further reduce the size of a projection optical system. Thus, a projection optical system preferably has two or more reflective surfaces. With two or more reflective surfaces, it is possible to fold a projection optical system in a direction substantially parallel to a screen surface. This makes it possible to reduce the size of a projection optical system in the direction of the depth of the screen, and this allows the projection space of the projection optical system to be reduced. By adding a reflective surface to a projection optical system to fold an optical path, it is possible to reduce the size of the projection optical system in the direction of the height of the screen.

All reflective surfaces preferably have an optical power. By the use of reflective surfaces having an optical power, it is possible to correct aberrations on the reflective surfaces; this makes it possible to correct the aberration of the entire projection optical system. Hence, by using, as all reflective surfaces, reflective surfaces having an optical power, it is possible to obtain higher optical performance.

A reflective surface is preferably placed closest to a screen surface within a projection optical system. By placing a reflective surface close to the screen surface to fold an optical path, it is possible to reduce a space required for projection of an image. Since light beams of different angles of view that are incident on a reflective surface are separated, as the reflective surface, a reflective surface having a free-form surface shape is arranged. Thus, it is possible to obtain a highly satisfactory aberration correction effect.

A reflective surface with an optical power preferably has a free-form surface shape. Since a free-form surface shape has a high degree of flexibility in design, it advantageously provides a high degree of flexibility in setting the direction in which rays are deflected. By the use of a free-form surface shape, it is possible to satisfactorily correct the inclination of an image plane and aberrations such as astigmatism. Moreover, a free-form surface that is used as a reflective surface preferably has a plane of symmetry. Advantageously, free-form surfaces having a plane of symmetry are produced and evaluated with a low degree of difficulty. Furthermore, a mirror and a refractive lens including a free-form surface are preferably formed of plastic. The use of plastic as constituent materials for optical devices (such as a mirror and a lens) including a free-form surface can reduce the cost of the optical devices.

As a refractive surface, a surface having two different optical powers in the x-axis direction and the y-axis direction (that is, an anamorphic aspherical surface) is preferably used. By the use of a refractive surface having two different optical powers in the x-axis direction and the y-axis direction, it is possible to correct an aberration that is asymmetrical between the x-axis direction and the y-axis direction. A refractive surface having two different optical powers in the x-axis direction and the y-axis direction is preferably used as a surface that is located close to a screen surface. However, since light beams of different angles of view are separated on the surface that is located closest to the screen surface, it is preferable to arrange a reflective surface having a free-form surface shape in order to obtain a highly satisfactory aberration correction effect.

Preferably, an intermediate image is temporarily formed within a projection optical system and is then projected by a reflective surface onto a screen surface to form an image. By producing an aberration in an intermediate image to cancel out a distortion produced in an optical device that is located closer to a screen surface than the intermediate image, it is possible to obtain satisfactory optical performance on the screen surface even in a wide-angle projection optical system. The formation of an intermediate image can reduce the size of a reflective surface, and this facilitates the assembly of the reflective surface.

A reflective surface that is located closest to a screen surface is preferably a concave surface. Using a concave reflective surface as the reflective surface that is located closest to the screen surface, it is possible to form an intermediate image by the optical power of the concave reflective surface. Thus, by the use of an aberration produced in the intermediate image, it is possible to correct the aberration of the entire projection optical system, such as distortion and the inclination of an image plane. When the reflective surface that is located closest to the screen surface is a convex reflective surface, it is necessary to use not only a convex mirror but also an optical device having a positive optical power in order to form a temporarily formed intermediate image onto the screen surface. For this reason, when an intermediate image is formed, it is difficult to achieve size reduction. Hence, when the reflective surface that is located closest to the screen surface is a convex reflective surface and no intermediate image is formed, it is preferable to add a refractive or reflective optical device having a free-form surface shape in order to correct aberration.

The specific optical construction of a projection optical system according to the present invention will now be described by way of example, using first to sixth embodiments. In FIGS. 1, 4, 7, 10, 13 and 16, the optical constructions (such as the optical arrangements and the projection optical paths) of the entire projection optical paths from a display device surface SG to a screen surface SL in the first to sixth embodiments are shown in cross section (in cross section on a short side), as seen in the direction of a long side of the screen of the display device surface SG. In an orthogonal coordinate system (x, y, z) where the direction of a normal to the screen of the display device surface SG is referred to as an "z-direction", the direction of the short side of the screen of the display device surface SG is referred to as a "y-direction" and the direction of the long side of the screen of the display device surface SG is referred to as an "x-direction", FIGS. 1, 4, 7, 10, 13 and 16 show, in y-z cross section, the optical constructions of the first to sixth embodiments of the projection optical system PO. The lens represented by Li (i=1, 2, 3, . . . ) refers to the i-th lens counting from the side of the display device surface SG (the reduction side).

The projection optical system. PO of the first to sixth embodiments is composed of: a refractive optical system LG formed with a plurality of lenses Li and the like; and a curved mirror MR or first and second curved mirrors M1 and M2, which are arranged sequentially from the reduction side (the side of the display device surface SG) to the enlargement side (the side of the screen surface SL). The projection optical system PO adjusts focus by moving at least one optical device having an optical power. The projection optical system PO is symmetrical with respect to the y-z plane. Thus, the reflective surfaces of the curved mirror MR and the first and second curved mirrors M1 and M2 are symmetrical with respect to a plane, and their symmetry planes are the y-z plane. The optical constructions of the embodiments will be described in detail below. The optical power of a free-form surface, which will be described later, refers to an optical power in the vicinity of the intersection between a screen-center chief ray and the reflective surface during proximity projection.

In the first embodiment (FIG. 1), the refractive optical system LG is composed of an aperture ST and first to seventh lenses L1 to L7, which are arranged sequentially from the reduction side (the side of the display device surface SG). The first lens L1 is a positive meniscus lens (both sides of which have a rotationally symmetrical aspherical surface) convex to the reduction side. The second lens L2 is a cemented lens composed of a positive biconvex lens and a negative biconcave lens. The third lens L3 is a positive biconvex lens. The fourth lens L4 is a positive biconvex lens. The fifth lens L5 is a positive biconvex lens. The sixth lens L6 is a negative meniscus lens (both sides of which have a rotationally symmetrical aspherical surface) convex to the reduction side. The seventh lens L7 is a negative biconcave lens (where the surface of the reduction side is a rotationally symmetrical aspherical surface and the surface of the enlargement side is an anamorphic aspherical surface). On the enlargement side (the side of the screen surface SL) of the refractive optical system LG, the first and second curved mirrors M1 and M2, whose reflective surfaces are shaped in the form of a free-form surface, are arranged. The first mirror M1 has a positive optical power in the x-direction and a negative optical power (substantially no optical power) in the y-direction; the second mirror M2 has a positive optical power. The second mirror M2 has a higher optical power in the x-direction than that in the y-direction. An image on the display device surface SG is formed within the projection optical system PO. When focus is adjusted, the fourth lens L4 and the second curved mirror M2 are moved, and thus the angle of incidence with respect to the screen surface SL differs before and after focus is achieved, with the result that trapezoidal distortion is satisfactorily corrected.

In the second embodiment (FIG. 4), the refractive optical system LG is composed of an aperture ST and first to seventh lenses L1 to L7, which are arranged sequentially from the reduction side (the side of the display device surface SG). The first lens L1 is a positive meniscus lens (both sides of which have a rotationally symmetrical aspherical surface) convex to the reduction side. The second lens L2 is a cemented lens composed of a positive biconvex lens and a negative biconcave lens. The third lens L3 is a positive biconvex lens. The fourth lens L4 is a positive biconvex lens. The fifth lens L5 is a positive biconvex lens. The sixth lens L6 is a negative meniscus lens (both sides of which have a rotationally symmetrical aspherical surface) convex to the reduction side. The seventh lens L7 is a negative biconcave lens (where the surface of the reduction side is a rotationally symmetrical aspherical surface and the surface of the enlargement side is an anamorphic aspherical surface). On the enlargement side (the side of the screen surface SL) of the refractive optical system LG, the first and second curved mirrors M1 and M2, whose reflective surfaces are shaped in the form of a free-form surface, are arranged. The first mirror M1 has a positive optical power in the x-direction and a positive optical power (substantially no optical power) in the y-direction; the second mirror M2 has a positive optical power. The second mirror M2 has a higher optical power in the x-direction than that in the y-direction. An image on the display device surface SG is formed within the projection optical system PO. When focus is adjusted, the first curved mirror M1 is moved, and thus the angle of incidence with respect to the screen surface SL differs before and after focus is achieved, with the result that trapezoidal distortion is satisfactorily corrected.

In the third embodiment (FIG. 7), the refractive optical system LG is composed of first to fourth lenses L1 to L4, an aperture ST and fifth to eighth lenses L5 to L8, which are arranged sequentially from the reduction side (the side of the display device surface SG). The first lens L1 is a positive biconvex lens (both sides of which have a rotationally symmetrical aspherical surface). The second lens L2 is negative biconcave lens. The third lens L3 is a cemented lens composed of a positive biconvex lens and a negative meniscus lens concave to the reduction side. The fourth lens L4 is a positive meniscus lens (where the surface of the reduction side is a rotationally symmetrical aspherical surface) convex to the reduction side. The fifth lens L5 is a positive meniscus lens concave to the reduction side. The sixth lens L6 is a positive biconvex lens. The seventh lens L7 is a negative meniscus lens (both sides of which have a rotationally symmetrical aspherical surface) concave to the reduction side. The eighth lens L8 is a negative meniscus lens (both sides of which have a rotationally symmetrical aspherical surface) convex to the reduction side. On the enlargement side (the side of the screen surface SL) of the refractive optical system LG, the curved mirror MR, whose reflective surface is shaped in the form of a free-form surface, is arranged. The curved mirror MR has a positive optical power and has a higher optical power in the x-direction than that in the y-direction. An image on the display device surface SG is formed within the projection optical system PO. When focus is adjusted, the curved mirror MR is moved, and thus the angle of incidence with respect to the screen surface SL differs before and after focus is achieved, with the result that trapezoidal distortion is satisfactorily corrected.

In the fourth embodiment (FIG. 10), the refractive optical system LG is composed of an aperture ST and first to fifth lenses L1 to L5, which are arranged sequentially from the reduction side (the side of the display device surface SG). The first lens L1 is a cemented lens composed of a negative meniscus lens (where the surface of the reduction side is a rotationally symmetrical aspherical surface) convex to the reduction side and a positive biconvex lens. The second lens L2 is a negative biconcave lens. The third lens L3 is a positive biconvex lens. The fourth lens L4 is a positive biconvex lens. The fifth lens L5 is a negative lens (where the surface of the reduction side is an anamorphic aspherical surface and the surface of the enlargement side is a free-form surface) concave to the reduction side. On the enlargement side (the side of the screen surface SL) of the refractive optical system LG, the curved mirror MR, whose reflective surface is shaped in the form of a free-form surface, is arranged. The curved mirror MR has a positive optical power and has a higher optical power in the x-direction than that in the y-direction. An image on the display device surface SG is formed within the projection optical system PO. When focus is adjusted, the fourth and fifth lenses L4 and L5 and the curved mirror MR are moved, and thus the angle of incidence with respect to the screen surface SL differs before and after focus is achieved, with the result that trapezoidal distortion is satisfactorily corrected.

In the fifth embodiment (FIG. 13), the refractive optical system LG is composed of first and second lenses L1 and L2, an aperture ST and third to ninth lenses L3 to L9, which are arranged sequentially from the reduction side (the side of the display device surface SG). The first lens L1 is a cemented lens composed of a positive biconvex lens and a negative biconcave lens. The second lens L2 is a positive meniscus lens (both sides of which have a rotationally symmetrical aspherical surface) convex to the reduction side. The third lens L3 is a positive biconvex lens. The fourth lens L4 is a negative biconcave lens. The fifth lens L5 is a positive meniscus lens (both sides of which have a rotationally symmetrical aspherical surface) concave to the reduction side. The sixth lens L6 is a negative meniscus lens concave to the reduction side. The seventh lens L7 is a meniscus lens (where the surface of the reduction side is a rotationally symmetrical aspherical surface and the surface of the enlargement side is an anamorphic aspherical surface) concave to the reduction side. The eighth lens L8 is a free-form surface lens (where the surface of the reduction side is a free-form surface). The ninth lens L9 is a free-form surface lens (where the surface of the reduction side is a free-form surface). On the enlargement side (the side of the screen surface SL) of the refractive optical system LG, the first and second curved mirror M1 and M2, whose reflective surfaces are shaped in the form of a free-form surface, are arranged. The first mirror M1 has a negative optical power (substantially no optical power) in the x-direction and a positive optical power in the y-direction; the second mirror M2 has a negative optical power. The second mirror M2 has a higher negative optical power in the x-direction than that in the y-direction. When focus is adjusted, the eighth and ninth lenses L8 and L9 are moved, and thus the angle of incidence with respect to the screen surface SL differs before and after focus is achieved, with the result that trapezoidal distortion is satisfactorily corrected.

In the sixth embodiment (FIG. 16), the refractive optical system LG is composed of first to third lenses L1 to L3, an aperture ST and fourth to ninth lenses L4 to L9, which are arranged sequentially from the reduction side (the side of the display device surface SG); a cover glass CG is arranged on the reduction side of the refractive optical system LG. The first lens L1 is a plano-concave lens (where the surface of the reduction side is a rotationally symmetrical aspherical surface) concave to the reduction side. The second lens L2 is a cemented lens composed of a negative biconcave lens and a positive biconvex lens. The third lens L3 is a positive meniscus lens concave to the reduction side. The fourth lens L4 is a positive biconvex lens. The fifth lens L5 is a negative biconcave lens (where the surface of the reduction side is a rotationally symmetrical aspherical surface). The sixth lens L6 is a negative meniscus lens convex to the reduction side. The seventh lens L7 is a positive meniscus lens (where the surface of the reduction side is a free-form surface) concave to the reduction side. The eighth lens L8 is a free-form surface lens (where the surface of the enlargement side is a free-form surface). The ninth lens L9 is a free-form surface lens (where the surface of the reduction side is a free-form surface). On the enlargement side (the side of the screen surface SL) of the refractive optical system LG, the first and second curved mirror M1 and M2, whose reflective surfaces are shaped in the form of a free-form surface, are arranged. The first curved mirror M1 has a positive optical power in the x-direction and a negative optical power in the y-direction; the second curved mirror M2 has a negative optical power in the x-direction and a positive optical power (substantially no optical power) in the y-direction. When focus is adjusted, the eighth lens L8 is moved, and thus the angle of incidence with respect to the screen surface SL differs before and after focus is achieved, with the result that trapezoidal distortion is satisfactorily corrected.

In the first to sixth embodiments, by varying, when focus is achieved, at least one of the incident angles $\theta f$ and $\theta n$, it is possible not only to increase the size of the screen but also to decrease the projection distance and to satisfactorily correct trapezoidal distortion produced when the projection distance is varied. As in the first, fourth and fifth embodiments, it is preferable to move, when focus is achieved, two or more optical devices in order to reduce a projection space. For example, as in the first and fourth embodiments, by moving, when focus is adjusted, a total of two optical devices, namely one curved mirror MR and one refractive lens, it is possible to share functions for achieving focus and correcting the inclination of an image plane, between the two optical devices. This makes it possible to obtain satisfactory performance before and after focus is achieved.

The first to sixth embodiments are directed to the projection optical system PO for an image projection device that enlarges and projects a display image onto the screen surface SL. Thus, the display device surface SG corresponds to an image formation surface where a two-dimensional image is formed such as by modulating light intensity; the screen surface SL corresponds to its projection image plane. Although, in each embodiment, a digital micromirror device is assumed to be used as the display device, the display device is not limited to such a digital micromirror device, and any other non-light-emitting/reflective (or transmissive) display device (for example, a liquid crystal display device) suitable for the projection optical system PO of the individual embodiments may be used. In the case of a digital micromirror device being used as the display device, when the display device surface SG is illuminated by an illumination optical system, light incident on the display device surface SG is reflected by both micromirrors in an on state and micromirrors in an off state (for example, in a state where each one is inclined at an angle of +12° or −12°), with the result that the light is modulated spatially. In this case, light that is reflected by the micromirrors in the on state only enters the projection optical system PO and is then projected onto the screen surface SL.

As will be understood from the above description, the embodiments described above and Examples described later include the constructions of the following projection optical systems and image projection devices. With one of the constructions, it is possible not only to increase the size of a screen but also to decrease a projection distance and to satisfactorily correct trapezoidal distortion produced when a projection distance is varied.

(T1) A projection optical system that enlarges and projects an image on a display device surface onto a screen surface, including one or more reflective surfaces having an optical power between the display device surface and the screen surface, characterized in that, by moving at least one optical device having an optical power, focus is adjusted, and at least one of the incident angle of rays incident on the ends of the upper side of the screen of the screen surface and the incident angle of rays incident on the ends of the lower side of the screen of the screen surface is varied when focus is achieved.

(T2) The projection optical system described in item (T1) above, characterized in that, when focus is adjusted by increasing a projection distance, the incident angle $\theta$ of rays whose incident angle $\theta$ is larger is decreased.

(T3) The projection optical system described in item (T1) or (T2) above, characterized in that, when focus is adjusted by increasing the projection distance, the incident angle $\theta$ of rays whose incident angle $\theta$ is smaller is increased.

(T4) The projection optical system described in any one of items (T1) to (T3) above, characterized in that at least one of conditional formulas (1), (1a), (2), (2a), (3), (4), (5) and (5a) described previously is satisfied.

(T5) The projection optical system described in any one of items (T1) to (T4) above, characterized in that it includes at least one refractive optical device having an optical power.

(T6) The projection optical system described in any one of items (T1) to (T5) above, characterized in that the rotationally symmetrical axes of at least two optical devices coincide.

(T7) The projection optical system described in any one of items (T1) to (T6) above, characterized in that, in the focus adjustment, at least one reflective surface or at least one refractive optical device is moved.

(T8) The projection optical system described in any one of items (T1) to (T7) above, characterized in that it further includes, between the display device surface and the screen surface, a flat mirror for folding an optical path.

(T9) The projection optical system described in any one of items (T1) to (T8) above, characterized in that it includes at least one refractive surface formed with a free-form surface.

(T10) The projection optical system described in any one of items (T1) to (T9) above, characterized in that it includes at least one reflective surface formed with a free-form surface.

(U1) An image projection device including a display device for forming a two-dimensional image and a projection optical system for enlarging and projecting an image on a display device surface thereof onto a screen surface, characterized in that the projection optical system includes one or more reflective surfaces having an optical power between the display device surface and the screen surface, by moving at least one optical device having an optical power, focus is adjusted and at least one of the incident angle of rays incident on the ends of the upper side of the screen of the screen surface and the incident angle of rays incident on the ends of the lower side of the screen of the screen surface is varied when focus is achieved.

(U2) The image projection device described in item (U1) above, characterized in that, when focus is adjusted by increasing a projection distance, the incident angle of rays whose incident angle $\theta$ is larger is decreased.

(U3) The image projection device described in item (U1) or (U2) above, characterized in that, when focus is adjusted by increasing the projection distance, the incident angle $\theta$ of rays whose incident angle $\theta$ is smaller is increased.

(U4) The image projection device described in any one of items (U1) to (U3) above, characterized in that at least one of conditional formulas (1), (1a), (2), (2a), (3), (4), (5) and (5a) described previously is satisfied.

(U5) The image projection device described in any one of items (U1) to (U4) above, characterized in that it includes at least one refractive optical device having an optical power.

(U6) The image projection device described in any one of items (U1) to (U5) above, characterized in that the rotationally symmetrical axes of at least two optical devices coincide.

(U7) The image projection device described in any one of items (U1) to (U6) above, characterized in that, in the focus adjustment, at least one reflective surface or at least one refractive optical device is moved.

(U8) The image projection device described in any one of items (U1) to (U7) above, characterized in that it further includes, between the display device surface and the screen surface, a flat mirror for folding an optical path.

(U9) The image projection device described in any one of items (U1) to (U8) above, characterized in that it includes at least one refractive surface formed with a free-form surface.

(U10) The image projection device described in any one of items (U1) to (U9) above, characterized in that it includes at least one reflective surface formed with a free-form surface.

(U11) The image projection device described in any one of items (U1) to (U10) above, characterized in that, it further includes, an illumination optical system for illuminating the display device surface.

EXAMPLES

Projection optical systems and the like embodying the present invention will be more specifically described below with reference to construction data and the like. Examples 1 to 6 that will be described below are numerical examples corresponding to the first to sixth embodiments, respectively, described above. Ray diagrams (FIGS. 1, 4, 7, 10, 13 and 16) showing the optical constructions of the first to sixth embodiments show the corresponding optical arrangements, projection optical paths and the like of Examples 1 to 6, respectively.

Tables 1 to 34 show the construction data of Examples 1 to 6; Table 35 shows projection magnifications ($\beta x$: the projection magnification in the direction of a long side of a screen, $\beta y$: the projection magnification in the direction of a short side of the screen) and the radius of the aperture R (mm) in the Examples; and Table 36 shows data and the like corresponding to the conditional formulas in the Examples. The data shown in Table 36 is based on the projection magnifications in (A): a shortest-distance projection state and in (B): a long-distance projection state, which are shown in Table 35, in the Examples. The screen sizes of screen surfaces at $\beta 1$ and $\beta 2$ are calculated from the size of the display device surface (8.294×11.06 mm$^2$) and the magnifications $\beta 1$ and $\beta 2$ (the screen sizes are in units of inches). On basic optical constructions shown in Tables 1, 7, 13, 18, 24 and 30, in the system extending from the display device surface SG (the symbol S0 represents the image display surface of the display device and corresponds to an object plane) on the reduction side to the screen surface SL (corresponding to an image plane) on the enlargement side, the symbol Si (i=0, 1, 2, 3, ...) represents the i-th surface counting from the reduction side, and the symbol ri (i=0, 1, 2, 3, ...) represents the radius of curvature (mm) of the surface Si. The symbol di (i=0, 1, 2, 3, ...) represents an axial distance (mm; in the case of an axial distance between eccentric surfaces, it is given as eccentricity data) between the surface Si and the surface Si+1; the symbols Ni (i=0, 1, 2, 3, ...) and vi (i=0, 1, 2, 3, ...) represent an index of refraction (Nd) for the d-line of an optical material located within the axial surface-to-surface distance di and an Abbe number (vd), respectively.

For surfaces that are eccentric relative to the surface closest to the reduction side, asterisks (*) are placed in the "surface Si" column for identification, and their eccentricity data is shown in Tables 2, 8, 14, 19, 25 and 31. In an orthogonal coordinate system (x, y, z) representing eccentricity data, the position of a surface subjected to parallel eccentricity is represented by surface-vertex coordinates (XDE, YDE, ZDE)= {the parallel eccentricity (mm) in the x-axis direction, the parallel eccentricity (mm) in the y-axis direction, the parallel eccentricity (mm) in the z-axis direction} having their origin (0, 0, 0) at the center of the object plane S0 on the xy-plane (the x-axis direction: the direction of a long side of the screen of the display device surface SG, the y-axis direction: the direction of a short side of the screen of the display device surface SG), and the inclination of the surface (rotational eccentricity) is represented by a rotational angle ADE (°) about an axis of the x-direction whose rotational center is the vertex of the surface. The order of eccentricity is XDE, YDE, ZDE and ADE. The size (mm) of an effective area of the display device surface SG (the object plane S0) is shown in addition to the eccentricity data.

Focus data shown in Tables 3, 9, 15, 20, 26 and 32 refers to the axial surface-to-surface distances di or the surface-vertex coordinates (XDE, YDE, ZDE), which are varied by the focusing in the Examples, and shows focus positions in (A): the shortest-distance projection state and in (B): the long-distance projection state. No data is listed that is not varied by the focusing.

For the surfaces Si that have a rotationally symmetrical aspherical surface, the symbols #A are placed in the "surface Si" column for identification. The surface Si that has a rotationally symmetrical aspherical surface is defined by formula (AS) below using a local orthogonal coordinate system (x, y, z) having its origin at the vertex of the surface. Tables 4, 10, 16, 21, 27 and 33 show data on the aspherical surfaces of the Examples. The coefficient of any term that does not appear in the Tables is 0, and "E–n" stands for "×10$^{-n}$" for all the data.

$$z=(c\cdot h^2)/[1+\sqrt{\{1-(1+K)\cdot c^2\cdot h^2\}}]+A\cdot h^4+B\cdot g^6+C\cdot h^8+D\cdot g^{10}+E\cdot h^{12}+F\cdot h^{14}+G\cdot h^{16}+H\cdot g^{18}+J\cdot h^{20} \quad (AS)$$

where z represents a displacement in the z-axis direction at a height h (relative to a surface vertex);

h represents a height (h$^2$=x$^2$+y$^2$) in a direction perpendicular to the z-axis;

c represents a curvature (=1/ri) at the surface vertex;

K represents a conic constant; and

A, ..., J represent aspheric constants.

For the surfaces Si that have an anamorphic aspherical surface, the symbols #B are placed in the "surface Si" column for identification. The surfaces Si that has an anamorphic aspherical surface is defined by formula (BS) below using a local orthogonal coordinate system (x, y, z) having its origin at the vertex of the surface. Tables 5, 11, 22 and 28 show data on the anamorphic aspherical surfaces of Examples 1, 2, 4 and 5. The coefficient of any term that does not appear in the Tables is 0, and "E–n" stands for "×10$^{-n}$" for all the data.

$$z=(CUX\cdot x^2+CUY\cdot y^2)/[1+\sqrt{\{1-(1+KX)\cdot CUX^2\cdot x^2-(1+KY)\cdot CUY^2\cdot y^2\}}]+AR\cdot\{(1-AP)\cdot x^2+(1+AP)\cdot y^2\}^2+BR\cdot\{(1-BP)\cdot x^2+(1+BP)\cdot y^2\}^3+CR\cdot\{(1-CP)\cdot x^2+(1+CP)\cdot y^2\}^4+DR\cdot\{(1-DP)\cdot x^2+(1+DP)\cdot y^2\}^5 \quad (BS)$$

where x, y represent orthogonal coordinates on a plane perpendicular to the z-axis;

z represents a displacement in the z-axis direction at a position having the coordinates (x, y) (relative to a surface vertex);

CUX represents a curvature at the surface vertex in the x-axis direction;

CUY represents a curvature at the surface vertex in the y-axis direction;

KX represents a conic constant in the x-axis direction;

KY represents a conic constant in the y-axis direction;

AR, BR, CR, DR represent rotationally symmetrical components of the fourth-, sixth-, eighth- and tenth-order deformation coefficients with respect to a cone; and

AP, BP, CP, DP represent the non-rotationally symmetrical components of the fourth-, sixth-, eighth- and tenth-order deformation coefficients with respect to the cone.

For the surfaces Si that has a free-form surface, the symbols #C are placed in the "surface Si" column for identification. The surface Si that has a free-form surface is defined by formula (CS) below using a local orthogonal coordinate system (x, y, z) having its origin at the vertex of the surface. Tables 6, 12, 17, 23, 29 and 34 show data on the polynomial free-form surfaces of the Examples. The coefficient of any term that does not appear in the Tables is 0, and "E−n" stands for "×10$^{-n}$" for all the data.

$$z=(c \cdot h^2)/[1+\sqrt{\{1-(1+K) \cdot c^2 \cdot h^2\}}]+\Sigma\Sigma\{C(j,k) \cdot x^j \cdot y^k\} \quad \text{(CS)}$$

where z represents a displacement in the z-axis direction at a height h (relative to a surface vertex);

h represents a height ($h^2=x^2+y^2$) in a direction perpendicular to the z-axis;

c represents a curvature (=1/ri) at the surface vertex;

K represents a conic constant; and

C(j, k) represents a polynomial free-from surface coefficient of the j-th order with respect to x and the k-th order with respect to y.

The optical performance of the Examples is shown in the form of spot diagrams (FIGS. 2, 5, 8, 11, 14 and 17) and distortion diagrams (FIGS. 3, 6, 9, 12, 15 and 18). FIGS. 2(A), 3(A), 5(A), 6(A), 8(A), 9(A), 11(A), 12(A), 14(A), 15(A), 17(A) and 18(A) show the optical performance in the shortest-distance projection state when focus is achieved, and FIGS. 2(B), 3(B), 5(B), 6(B), 8(B), 9(B), 11(B), 12(B), 14(B), 15(B), 17(B) and 18(B) show the optical performance in the long-distance projection state when focus is achieved. The spot diagrams show imaging characteristics (mm) on the screen surface SL for each of the following three lines: the C-line (with a wavelength of 656.3 nm), the d-line (with a wavelength of 587.6 nm) and the g-line (with a wavelength of 435.8 nm). The field position of each spot represents coordinates (x, y) on the display device surface SG (the object plane S0). The distortion diagrams show ray positions (mm) on the screen surface SL corresponding to a rectangular grid (the x-axis direction: the direction of the long side of the screen, the y-axis direction: the direction of the short side of the screen) on the display device surface SG with solid lines representing the distorted grids in the Examples and broken lines representing the grids (without distortion) of ideal image points with consideration given to the anamorphic ratio.

TABLE 1

Example 1

| Si | | ri [mm] | di [mm] | Ni | vi | Elements, etc. |
|---|---|---|---|---|---|---|
| S0 | | ∞ | | | | SG (Object plane) |
| S1 | * | ∞ | 0.0000 | | | ST LG |
| S2 | #A | 22.3488 | 14.9090 | 1.79850 | 22.60 | L1 |
| S3 | #A | 103.9437 | 2.8874 | | | |
| S4 | | 166.6050 | 7.1906 | 1.68150 | 54.42 | L2 |

TABLE 1-continued

Example 1

| Si | | ri [mm] | di [mm] | Ni | vi | Elements, etc. |
|---|---|---|---|---|---|---|
| S5 | | −10.0042 | 2.0741 | 1.84745 | 26.33 | |
| S6 | | 40.9358 | 0.5027 | | | |
| S7 | | 41.8942 | 5.4915 | 1.48749 | 70.44 | L3 |
| S8 | | −30.4888 | d8 | | | |
| S9 | | 224.5766 | 15.0000 | 1.84773 | 28.82 | L4 |
| S10 | | −75.7726 | d10 | | | |
| S11 | | 57.8141 | 8.1521 | 1.55598 | 43.33 | L5 |
| S12 | | −1700.6161 | 1.4398 | | | |
| S13 | #A | 89.1510 | 10.8641 | 1.53050 | 55.72 | L6 |
| S14 | #A | 28.2758 | 7.4052 | | | |
| S15 | #A | −60.1693 | 2.0000 | 1.53050 | 55.72 | L7 |
| S16 | #B | 1/CUX, 1/CUY | | | | |
| S17 | * #C | ∞ | | | | M1 |
| S18 | * #C | ∞ | | | | M2 |
| S19 | * | ∞ | | | | SL (Image plane) |

TABLE 2

Example 1

Eccentricity data: *

| Si | XDE | YDE | ZDE | ADE |
|---|---|---|---|---|
| S0 (SG) | 0 | 0 | 0 | 0 |
| S1 (ST) | 0 | 5.2 | 37.8271 | 0 |
| S17 (M1) | 0 | 5.2 | 257.1583 | 35.1806 |
| S18 (M2) | 0 | See focus data | See focus data | See focus data |
| S19 (SL) | 0 | 0 | See focus data | 75.95 |
| Size of an effective area of S0 (SG) | | x-direction y-direction | ±5.53 ±4.147 | |

TABLE 3

Example 1

Focus data

| | | (A) Shortest-distance projection state | (B) Long-distance projection state |
|---|---|---|---|
| | d8 | 44.0566 | 43.8175 |
| | d10 | 0.2000 | 0.4390 |
| S18 | YDE | −73.2520 | −70.0072 |
| | ZDE | 229.1629 | 231.4641 |
| | ADE | 76.9628 | 77.2418 |
| S19 | ZDE | 1233.8212 | 2058.6783 |

TABLE 4

Example 1

Aspherical surface data of Si: #A

| Si | S2 | S3 | S13 | S14 | S15 |
|---|---|---|---|---|---|
| K | 0 | 0 | 0 | 0 | 0 |
| A | 5.73852E−06 | 1.80499E−05 | −1.31794E−05 | −1.92708E−05 | 2.32021E−05 |
| B | 5.11170E−09 | −5.33069E−08 | −5.09303E−09 | −8.42125E−09 | −2.00514E−08 |
| C | 9.73550E−11 | 8.42468E−10 | 1.45833E−11 | 2.71761E−11 | 2.83196E−11 |
| D | −7.00021E−13 | −1.62906E−11 | −7.93406E−15 | −4.65070E−14 | −3.67273E−14 |

TABLE 5

Example 1

Anamorphic aspherical surface data of S16: #B

| 1/CUX | 28.189 | 1/CUY | 28.4608 |
|---|---|---|---|
| KX | 0 | KY | 0 |
| AP | 4.84393E+03 | AR | −9.40878E−16 |
| BP | −2.22185E−03 | BR | −2.18494E−08 |
| CP | 7.03086E−03 | CR | 3.85485E−11 |
| DP | 6.85980E−03 | DR | −3.61862E−14 |

TABLE 6

Example 1

Polynomial free-form surface data of Si: #C

| C(j, k) | S17 | S18 |
|---|---|---|
| C(2, 0) | −8.79364E−04 | 1.19090E−02 |
| C(0, 2) | −4.10379E−04 | 1.04955E−02 |
| C(2, 1) | 4.52637E−05 | 1.08932E−05 |
| C(0, 3) | −1.96826E−05 | 4.62873E−05 |
| C(4, 0) | 2.05968E−07 | −1.10560E−06 |
| C(2, 2) | −2.74452E−06 | −1.39965E−06 |
| C(0, 4) | 2.58388E−06 | −1.39400E−06 |
| C(4, 1) | −5.58278E−08 | 2.46491E−09 |
| C(2, 3) | 7.43830E−08 | −3.00359E−08 |
| C(0, 5) | −9.34668E−08 | 2.74012E−09 |
| C(6, 0) | −2.79788E−10 | 6.99867E−11 |
| C(4, 2) | 2.10034E−09 | 6.01378E−10 |
| C(2, 4) | −1.29782E−09 | 1.33183E−09 |
| C(0, 6) | 1.38101E−09 | 2.20059E−10 |
| C(6, 1) | 2.54109E−11 | −1.92083E−12 |
| C(4, 3) | −2.91120E−11 | −9.05570E−12 |
| C(2, 5) | 1.89648E−11 | −1.49998E−11 |
| C(0, 7) | −5.29895E−12 | −2.45368E−12 |
| C(8, 0) | −3.27592E−14 | 2.40658E−14 |
| C(6, 2) | −3.46324E−13 | 3.98639E−15 |
| C(4, 4) | 1.41180E−13 | 4.51497E−14 |
| C(2, 6) | −1.43372E−13 | 6.18224E−14 |
| C(0, 8) | −2.53802E−14 | 9.68351E−15 |

TABLE 7

Example 2

| Si | | ri [mm] | di [mm] | Ni | vi | Elements, etc. |
|---|---|---|---|---|---|---|
| S0 | | ∞ | | | | SG (Object plane) |
| S1 | * | ∞ | 0.0000 | | | ST LG |
| S2 | #A | 21.0662 | 12.5667 | 1.79850 | 22.60 | L1 |

TABLE 7-continued

Example 2

| Si | | ri [mm] | di [mm] | Ni | vi | Elements, etc. |
|---|---|---|---|---|---|---|
| S3 | #A | 181.2635 | 1.0913 | | | |
| S4 | | 681.7692 | 9.2466 | 1.65604 | 55.66 | L2 |
| S5 | | −9.5204 | 2.0000 | 1.84717 | 25.38 | |
| S6 | | 37.5490 | 0.6131 | | | |
| S7 | | 42.0911 | 5.0078 | 1.48898 | 70.22 | L3 |
| S8 | | −31.3189 | 44.1425 | | | |
| S9 | | 156.0499 | 10.3609 | 1.80798 | 36.44 | L4 |
| S10 | | −78.2406 | 0.3850 | | | |
| S11 | | 73.7548 | 7.6903 | 1.60211 | 34.62 | L5 |
| S12 | | −434.5097 | 1.7771 | | | |
| S13 | #A | 81.0938 | 11.0027 | 1.53050 | 55.72 | L6 |
| S14 | #A | 28.7411 | 9.2704 | | | |
| S15 | #A | −79.3076 | 3.8319 | 1.53050 | 55.72 | L7 |
| S16 | #B | 1/CUX, 1/CUY | | | | |
| S17 | * #C | ∞ | | | | M1 |
| S18 | * #C | ∞ | | | | M2 |
| S19 | * | ∞ | | | | SL (Image plane) |

TABLE 8

Example 2

Eccentricity data: *

| Si | XDE | YDE | ZDE | ADE |
|---|---|---|---|---|
| S0 (SG) | 0 | 0 | 0 | 0 |
| S1 (ST) | 0 | 5.2501 | 37.8271 | 0 |
| S17 (M1) | 0 | See focus data | See focus data | See focus data |
| S18 (M2) | 0 | −106.4468 | 246.8667 | 89.4640 |
| S19 (SL) | 0 | 0 | See focus data | 77.5391 |
| Size of an effective area of S0 (SG) | | x-direction | ±5.53 | |
| | | y-direction | ±4.147 | |

TABLE 9

Example 2

Focus data

| | | (A) Shortest-distance projection state | (B) Long-distance projection state |
|---|---|---|---|
| S17 | YDE | 5.2501 | −2.4767 |
| | ZDE | 271.9211 | 278.2812 |
| | ADE | 37.9384 | 37.3876 |
| S19 | ZDE | 1358.2212 | 2285.5759 |

TABLE 10

Example 2

Aspherical surface data of Si: #A

| Si | S2 | S3 | S13 | S14 | S15 |
|---|---|---|---|---|---|
| K | 0 | 0 | 0 | 0 | 0 |
| A | 8.01656E−06 | 1.77477E−05 | −1.35599E−05 | −1.94246E−05 | 1.86610E−05 |
| B | 2.33042E−08 | −5.44087E−08 | −4.39681E−09 | −8.30603E−09 | −2.25500E−08 |
| C | 5.11847E−11 | 1.01337E−09 | 1.39429E−11 | 3.09758E−11 | 3.06699E−11 |
| D | −3.13566E−13 | −2.37145E−11 | −7.71556E−15 | −4.44877E−14 | −3.21811E−14 |

TABLE 11

Example 2

Anamorphic aspherical surface data of S16: #B

| | | | |
|---|---|---|---|
| 1/CUX | 2.79555E+01 | 1/CUY | 2.79839E+01 |
| KX | 0 | KY | 0 |
| AP | 5.95211E+05 | AR | 3.10687E-19 |
| BP | 2.50123E-03 | BR | -2.38859E-08 |
| CP | -1.26223E-03 | CR | 2.94884E-11 |
| DP | -9.56476E-04 | DR | -2.80966E-14 |

TABLE 12

Example 2

Polynomial free-form surface data of Si: #C

| C(j, k) | S17 | S18 |
|---|---|---|
| C(2, 0) | -5.89589E-04 | 9.20682E-03 |
| C(0, 2) | 1.05004E-03 | 8.91351E-03 |
| C(2, 1) | 2.56337E-05 | 5.80356E-05 |
| C(0, 3) | -9.80344E-05 | 7.98368E-05 |
| C(4, 0) | 1.39530E-07 | -7.21406E-07 |
| C(2, 2) | -1.34086E-06 | -7.74997E-07 |
| C(0, 4) | 3.95488E-06 | -1.27582E-06 |
| C(4, 1) | -2.20880E-08 | -8.22770E-09 |
| C(2, 3) | 4.90571E-08 | -4.53194E-08 |
| C(0, 5) | -8.88653E-08 | 1.09505E-09 |
| C(6, 0) | -2.08795E-10 | 1.42904E-10 |
| C(4, 2) | 5.52368E-10 | 5.66895E-10 |
| C(2, 4) | -1.17860E-09 | 1.37283E-09 |
| C(0, 6) | 1.15490E-09 | 2.12447E-10 |
| C(6, 1) | 8.25437E-12 | -7.48251E-13 |
| C(4, 3) | -3.72867E-12 | -8.28860E-12 |
| C(2, 5) | 1.53401E-11 | -1.46492E-11 |
| C(0, 7) | -8.17852E-12 | -2.54484E-12 |
| C(8, 0) | 3.89339E-14 | -1.16408E-14 |
| C(6, 2) | -9.43292E-14 | 1.57726E-15 |
| C(4, 4) | -2.81307E-15 | 4.61172E-14 |
| C(2, 6) | -7.54345E-14 | 5.94871E-14 |
| C(0, 8) | 2.49668E-14 | 1.06209E-14 |

TABLE 13

Example 3

| Si | | ri [mm] | di [mm] | Ni | vi | Elements, etc. |
|---|---|---|---|---|---|---|
| S0 | | ∞ | | | | SG (Object plane) |
| S1 | * #A | 20.1322 | 6.4562 | 1.79850 | 22.6 | L1  LG |
| S2 | #A | -39.0447 | 0.1000 | | | |
| S3 | | -36.3299 | 2.0000 | 1.82722 | 30.43 | L2 |
| S4 | | 11.8283 | 0.1000 | | | |
| S5 | | 11.9200 | 10.6245 | 1.70014 | 53.61 | L3 |
| S6 | | -10.1936 | 2.0000 | 1.79997 | 27.98 | |
| S7 | | -867.3773 | 0.1000 | | | |
| S8 | #A | 73.0177 | 2.1406 | 1.84963 | 37.25 | L4 |
| S9 | | 196.4592 | 0.1000 | | | |
| S10 | | ∞ | 54.7114 | | | ST |
| S11 | | -40.7293 | 4.7215 | 1.52243 | 52.46 | L5 |
| S12 | | -31.5648 | 0.1000 | | | |
| S13 | | 39.1412 | 10.3003 | 1.71204 | 32.39 | L6 |
| S14 | | -11388.7467 | 5.2647 | | | |
| S15 | #A | -41.1973 | 2.0000 | 1.85000 | 40.04 | L7 |
| S16 | #A | -101.0097 | 9.4537 | | | |
| S17 | #A | 69.4030 | 2.0000 | 1.85000 | 40.04 | L8 |
| S18 | #A | 29.5522 | | | | |
| S19 | * #C | ∞ | | | | MR |
| S20 | * | ∞ | | | | SL (Image plane) |

TABLE 14

Example 3

Eccentricity data: *

| Si | XDE | YDE | ZDE | ADE |
|---|---|---|---|---|
| S0(SG) | 0 | 0 | 0 | 0 |
| S1(ST) | 0 | 5.0000 | 37.7061 | 0 |
| S19(MR) | 0 | See focus data | See focus data | 0 |
| S20(SL) | 0 | 0 | See focus data | 0 |
| Size of an effective area of S0 (SG) | x-direction y-direction | ±5.53 ±4.147 | | |

TABLE 15

Example 3

Focus data

| | | (A) Shortest-distance projection state | (B) Long-distance projection state |
|---|---|---|---|
| S19 | YDE | 6.1638 | 4.4325 |
| | ZDE | 400.9630 | 384.2083 |
| S20 | ZDE | -208.6600 | -608.6600 |

TABLE 16

Example 3

Aspherical surface data of Si: #A

| Si | S1 | S2 | S8 | S15 | S16 | S17 | S18 |
|---|---|---|---|---|---|---|---|
| K | 0 | 0 | 0 | 0 | 0 | 0 | 0 |
| A | 8.34458E-06 | -3.99859E-06 | -2.44334E-05 | 4.66551E-06 | 1.48795E-06 | -8.44658E-06 | -9.58125E-06 |
| B | 4.27471E-08 | 5.18118E-08 | -5.66597E-08 | 7.11277E-09 | 5.44174E-10 | -7.73731E-09 | -4.73336E-09 |
| C | 2.16815E-10 | 1.13557E-10 | 9.66351E-10 | -5.42348E-12 | 5.80986E-12 | 1.12822E-11 | 4.83392E-12 |
| D | 1.17268E-12 | -2.72722E-12 | -2.86098E-11 | -5.05089E-17 | -7.22306E-15 | -2.78355E-15 | -3.99217E-15 |

TABLE 17

Example 3

Polynomial free-form surface data of Si: #C

| C (j, k) | S19 |
|---|---|
| C (2, 0) | −5.56088E−03 |
| C (0, 2) | −5.85732E−03 |
| C (2, 1) | 3.29218E−06 |
| C (0, 3) | 2.64951E−05 |
| C (4, 0) | 1.23036E−07 |
| C (2, 2) | 1.65422E−07 |
| C (0, 4) | −7.72433E−07 |
| C (4, 1) | −1.03928E−09 |
| C (2, 3) | −2.80426E−10 |
| C (0, 5) | 1.62256E−08 |
| C (6, 0) | −1.05666E−11 |
| C (4, 2) | −1.44043E−11 |
| C (2, 4) | −3.12586E−11 |
| C (0, 6) | −1.85094E−10 |
| C (6, 1) | 1.23382E−13 |
| C (4, 3) | 2.18350E−13 |
| C (2, 5) | 3.25130E−13 |
| C (0, 7) | 1.07505E−12 |
| C (8, 0) | 3.08541E−16 |
| C (6, 2) | −5.46141E−16 |
| C (4, 4) | −8.86386E−16 |
| C (2, 6) | −1.09277E−15 |
| C(0, 8) | −2.53860E−15 |

TABLE 18

Example 4

| Si | | ri [mm] | di [mm] | Ni | vi | Elements, etc. |
|---|---|---|---|---|---|---|
| S0 | | ∞ | | | | SG (Object plane) |
| S1 | * | ∞ | 0.0000 | | | ST LG |
| S2 | #A | 29.7825 | 14.4145 | 1.74779 | 24.36 | L1 |
| S3 | | 16.2811 | 7.5299 | 1.60108 | 58.93 | |
| S4 | | −16.1434 | 0.7000 | | | |
| S5 | | −15.3086 | 2.0000 | 1.84772 | 27.36 | L2 |
| S6 | | 210.7859 | 0.3779 | | | |
| S7 | #A | 69.0790 | 10.7072 | 1.79850 | 22.60 | L3 |
| S8 | #A | −38.2969 | 0.0000 | | | |
| S9 | * | 71.8761 | 15.0000 | 1.81748 | 43.07 | L4 |
| S10 | | −668.9211 | 7.9776 | | | |
| S11 | #B | 1/CUX, 1/CUY | 10.0000 | 1.49270 | 57.49 | L5 |
| S12 | * | #C | ∞ | | | |
| S13 | * | #C | ∞ | | | MR |
| S14 | * | ∞ | | | | SL (Image plane) |

TABLE 19

Example 4

Eccentricity data: *

| Si | XDE | YDE | ZDE | ADE |
|---|---|---|---|---|
| S0 (SG) | 0 | 0 | 0 | 0 |
| S1 (ST) | 0 | 6.0000 | 37.8 | 0 |
| S9 (L4) | 0 | 6.452 | See focus data | 0 |
| S12 (L5) | 0 | 6.452 | See focus data | 0.0332 |
| S13 (MR) | 0 | 6.452 | See focus data | 0 |
| S14 (SL) | 0 | 0 | See focus data | 0 |
| Size of an effective area of S0 (SG) | x-direction | ±5.53 | | |
| | y-direction | ±4.147 | | |

TABLE 20

Example 4

Focus data

| | | (A) Shortest-distance projection state | (B) Long-distance projection state |
|---|---|---|---|
| S9 | ZDE | 147.7381 | 151.5088 |
| S12 | ZDE | 180.7157 | 184.4864 |
| S13 | ZDE | 431.3400 | 422.5817 |
| S14 | ZDE | −168.6600 | −477.4183 |

TABLE 21

Example 4

Aspherical surface data of Si: #A

| Si | S2 | S7 | S8 |
|---|---|---|---|
| K | 0 | 0 | 0 |
| A | 5.63886E−06 | −1.11885E−05 | −1.46388E−06 |
| B | −8.26469E−09 | 3.13956E−09 | −6.47074E−09 |
| C | −3.25748E−11 | −7.79679E−11 | −2.15923E−11 |
| D | −5.73469E−15 | 1.43978E−13 | −4.54007E−14 |

TABLE 22

Example 4

Anamorphic aspherical surface data of S11: #B

| 1/CUX | −48.1755 | 1/CUY | −47.9663 |
|---|---|---|---|
| KX | 0 | KY | 0 |
| AP | 1.16463E−01 | AR | 2.71061E−06 |
| BP | 3.10168E−01 | BR | −1.37490E−09 |
| CP | 2.96943E−01 | CR | 1.13599E−12 |
| DP | 3.93767E−01 | DR | −2.16643E−16 |

TABLE 23

Example 4

Polynomial free-form surface data of Si: #C

| C (j, k) | S12 | S13 |
|---|---|---|
| C (0, 1) | −6.76428E−03 | 3.76089E−02 |
| C (2, 0) | 1.17397E−02 | −5.32140E−03 |
| C (0, 2) | 1.17605E−02 | −5.42836E−03 |
| C (2, 1) | 1.09370E−05 | 4.51180E−06 |
| C (0, 3) | −3.02988E−06 | 4.01391E−06 |
| C (4, 0) | 3.70820E−07 | 1.15321E−07 |
| C (2, 2) | 1.45575E−06 | 9.84271E−08 |
| C (0, 4) | 2.73942E−06 | 3.68404E−08 |
| C (4, 1) | −1.07237E−08 | −1.25324E−09 |
| C (2, 3) | 1.00220E−07 | −3.27131E−10 |
| C (0, 5) | −1.14106E−08 | 1.00428E−10 |
| C (6, 0) | 1.21334E−11 | −9.85999E−12 |
| C (4, 2) | 6.58088E−10 | −5.54105E−12 |
| C (2, 4) | −1.25786E−08 | −1.27851E−11 |
| C (0, 6) | −5.22679E−09 | −7.88964E−12 |
| C (6, 1) | −1.23749E−11 | 1.23417E−13 |
| C (4, 3) | −1.63969E−10 | 1.19269E−13 |
| C (2, 5) | 3.89790E−10 | 1.12364E−13 |
| C (0, 7) | 1.62813E−10 | 5.99490E−14 |
| C (8, 0) | −9.62460E−13 | 2.86696E−16 |
| C (6, 2) | −7.21856E−14 | −6.07609E−16 |
| C (4, 4) | 4.09231E−12 | −4.62449E−16 |
| C (2, 6) | −3.93643E−12 | −3.31945E−16 |
| C (0, 8) | −1.462E−12 | −1.59747E−16 |

TABLE 24

Example 5

| Si | | ri [mm] | di [mm] | Ni | vi | Elements, etc. | |
|---|---|---|---|---|---|---|---|
| S0 | | ∞ | | | | | SG (Object plane) |
| S1 | * | 33.7819 | 6.5215 | 1.73048 | 52.41 | L1 | LG |
| S2 | | −29.3619 | 2.0000 | 1.74167 | 26.59 | | |
| S3 | | 23.5426 | 0.4500 | | | | |
| S4 | #A | 16.8809 | 10.4119 | 1.48749 | 70.44 | L2 | |
| S5 | #A | 441.6224 | 1.8413 | | | | |
| S6 | | ∞ | 5.7573 | | | ST | |
| S7 | | 172.0525 | 3.6417 | 1.79850 | 22.60 | L3 | |
| S8 | | −48.7235 | 20.6215 | | | | |
| S9 | | −164.0391 | 2.0000 | 1.74429 | 24.50 | L4 | |
| S10 | | 41.5269 | 31.3244 | | | | |
| S11 | #A | −180.8559 | 15.0434 | 1.53050 | 55.70 | L5 | |
| S12 | #A | −49.9588 | 22.6883 | | | | |
| S13 | | −46.3573 | 2.0000 | 1.79850 | 22.60 | L6 | |
| S14 | | −50.9114 | 0.1000 | | | | |
| S15 | #A | −197.8671 | 3.5374 | 1.53050 | 55.72 | L7 | |
| S16 | #B | 1/CUX, 1/CUY | | | | | |
| S17 | * #C | ∞ | 6.8361 | 1.49270 | 57.49 | L8 | |
| S18 | | ∞ | | | | | |
| S19 | * #C | ∞ | 10 | 1.49270 | 57.49 | L9 | |
| S20 | | ∞ | | | | | |
| S21 | * #C | ∞ | | | | M1 | |
| S22 | * #C | ∞ | | | | M2 | |
| S23 | * | ∞ | | | | SL (Image plane) | |

TABLE 25

Example 5

Eccentricity data: *

| Si | XDE | YDE | ZDE | ADE |
|---|---|---|---|---|
| S0 (SG) | 0 | 0 | 0 | 0 |
| S1 (L1) | 0 | 9.8810 | 36.7000 | 0 |
| S17 (L8) | 0 | See focus data | See focus data | 0 |
| S19 (L9) | 0 | See focus data | See focus data | 0 |
| S21 (M1) | 0 | 9.8810 | 340.0000 | −59.7721 |
| S22 (M2) | 0 | 148.9188 | 220.0428 | 26.6100 |
| S23 (SL) | 0 | 0 | See focus data | −59.7721 |
| Size of an effective area of S0 (SG) | | x-direction y-direction | ±5.53 ±4.147 | |

TABLE 26

Example 5

Focus data

| | | (A) Shortest-distance projection state | (B) Long-distance projection state |
|---|---|---|---|
| S17 | YDE | 9.8810 | 2.4167 |
| | ZDE | 262.5995 | 247.6386 |
| S19 | YDE | 9.8810 | 3.2005 |
| | ZDE | 278.6418 | 268.9098 |
| S23 | ZDE | 373.3706 | 614.2816 |

TABLE 27

Example 5

Aspherical surface data of Si: #A

| Si | S4 | S5 | S11 | S12 | S15 |
|---|---|---|---|---|---|
| K | 0 | 0 | 0 | 0 | 0 |
| A | −6.90632E−06 | 3.22821E−05 | 2.53017E−06 | 2.78986E−07 | −4.87271E−06 |
| B | 3.71729E−08 | 1.24659E−07 | −5.37814E−10 | 1.29183E−09 | 2.96697E−11 |
| C | −1.23918E−10 | −1.77729E−10 | 4.50321E−13 | 3.12422E−13 | −7.21483E−13 |
| D | 2.22678E−12 | 8.32221E−12 | −1.10111E−16 | 7.33022E−18 | 3.42213E−16 |

TABLE 28

Example 5

Anamorphic aspherical surface data of S16: #B

| 1/CUX | −182.0299 | 1/CUY | −204.6841 |
|---|---|---|---|
| KX | 0 | KY | 0 |
| AP | −4.54643E−02 | AR | −2.27291E−06 |
| BP | 6.03315E−02 | BR | −1.17055E−09 |
| CP | 6.17553E−02 | CR | 3.53110E−13 |
| DP | 6.88602E−02 | DR | −3.18163E−17 |

TABLE 29

Example 5

Polynomial free-form surface data of Si: #C

| C (j, k) | S17 | S19 | S21 | S22 |
|---|---|---|---|---|
| C (0, 1) | −1.28145E−02 | 0.00000E+00 | −9.30960E−01 | 1.22290E+00 |
| C (2, 0) | −1.60551E−03 | 0.00000E+00 | 1.47685E−03 | −1.38628E−02 |
| C (0, 2) | −2.00286E−03 | 0.00000E+00 | 1.91794E−03 | −6.12846E−03 |
| C (2, 1) | −1.19197E−04 | 2.27468E−04 | −5.31965E−05 | 3.42912E−04 |

TABLE 29-continued

Example 5

Polynomial free-form surface data of Si: #C

| C (j, k) | S17 | S19 | S21 | S22 |
|---|---|---|---|---|
| C (0, 3) | 3.95086E−05 | 9.21830E−05 | 3.91912E−05 | 4.08398E−05 |
| C (4, 0) | −1.35569E−06 | 3.42274E−06 | −6.04066E−08 | 9.70100E−08 |
| C (2, 2) | 1.70085E−06 | −2.98635E−06 | 1.21801E−06 | −3.96157E−06 |
| C (0, 4) | −3.31585E−07 | −2.02415E−06 | −2.57946E−06 | −6.07660E−08 |
| C (4, 1) | 8.33489E−08 | −2.36709E−07 | 2.20180E−09 | −1.51515E−08 |
| C (2, 3) | 1.51546E−08 | −4.24301E−08 | −1.94230E−08 | 1.15349E−08 |
| C (0, 5) | 3.12391E−10 | 1.34538E−08 | 4.66643E−08 | −8.91703E−10 |
| C (6, 0) | −9.85652E−10 | 2.30106E−11 | −3.70021E−11 | −2.28824E−12 |
| C (4, 2) | −7.96318E−10 | 4.92187E−09 | −1.23387E−10 | 2.59406E−10 |
| C (2, 4) | −1.80716E−10 | 1.16660E−09 | 1.32472E−10 | 1.35757E−10 |
| C (0, 6) | 2.42113E−11 | 9.60097E−11 | −4.14725E−10 | 4.48392E−12 |
| C (6, 1) | 4.98494E−11 | 8.37087E−12 | 1.02248E−12 | 3.17797E−12 |
| C (4, 3) | −7.09543E−12 | −4.24449E−11 | 2.99205E−13 | −4.08135E−14 |
| C (2, 5) | −1.70570E−12 | −1.00256E−11 | −7.38193E−15 | −9.20936E−13 |
| C (0, 7) | 1.20223E−13 | −2.30381E−12 | 1.49560E−12 | 1.06466E−14 |
| C (8, 0) | 3.42380E−13 | −1.68103E−13 | −1.04697E−14 | −1.45769E−14 |
| C (6, 2) | −1.16932E−12 | −1.62905E−13 | 1.11917E−14 | −8.55603E−14 |
| C (4, 4) | 9.15660E−14 | 1.30698E−13 | 5.52936E−14 | −1.86907E−14 |
| C (2, 6) | 7.43222E−15 | 4.82510E−14 | −2.45056E−15 | −2.03739E−15 |
| C (0, 8) | −1.12163E−15 | 1.39428E−14 | 4.96955E−15 | −6.72618E−17 |
| C (8, 1) | −8.42384E−15 | 3.08354E−15 | 4.17959E−16 | 3.76919E−16 |
| C (6, 3) | 1.25499E−14 | 7.62375E−16 | −5.90549E−16 | 6.41988E−16 |
| C (4, 5) | 5.86190E−16 | −6.25278E−17 | −7.11553E−16 | 1.02946E−16 |
| C (2, 7) | 2.55812E−16 | −1.94154E−16 | −2.78127E−18 | 3.12645E−17 |
| C (0, 9) | −1.74242E−17 | −4.37542E−17 | −6.75446E−17 | −3.63634E−19 |
| C (10, 0) | −4.73695E−18 | 0.00000E+00 | −5.05847E−19 | −2.39489E−19 |
| C (8, 2) | 5.40772E−17 | 0.00000E+00 | −1.97245E−18 | −1.80712E−18 |
| C (6, 4) | −5.28839E−17 | 0.00000E+00 | 3.36105E−18 | −1.43058E−18 |
| C (4, 6) | −6.58571E−18 | 0.00000E+00 | 2.49108E−18 | −1.59088E−19 |
| C (2, 8) | −1.62968E−18 | 0.00000E+00 | 3.15118E−20 | −7.16990E−20 |
| C (0, 10) | 1.05334E−19 | 0.00000E+00 | 1.86726E−19 | 1.50925E−21 |

TABLE 30

Example 6

| Si | | ri [mm] | di [mm] | Ni | vi | Elements, etc. |
|---|---|---|---|---|---|---|
| S0 | | ∞ | 0.4700 | | | SG (Object plane) |
| S1 | | ∞ | 3.0000 | 1.50847 | 61.19 | CG |
| S2 | | ∞ | | | | |
| S3 | * #A | −93.8851 | 2.5389 | 1.80610 | 20.92 | L1 LG |
| S4 | | ∞ | 2.6341 | | | |
| S5 | | −131.7615 | 3.2326 | 1.62004 | 36.30 | L2 |
| S6 | | 36.9607 | 0.0100 | 1.55000 | 47.01 | |
| S7 | | 36.9607 | 7.4361 | 1.61800 | 63.34 | |
| S8 | | −26.0437 | 1.1866 | | | |
| S9 | | −39.0805 | 4.6593 | 1.58144 | 40.89 | L3 |
| S10 | | −27.1959 | 3.4427 | | | |
| S11 | | ∞ | 0.4784 | | | ST |
| S12 | | 29.0842 | 5.8767 | 1.49700 | 54.45 | L4 |
| S13 | | −36.8838 | 0.4136 | | | |
| S14 | #A | −176.9759 | 1.3983 | 1.51823 | 48.90 | L5 |
| S15 | | 55.0910 | 1.2291 | | | |
| S16 | | 73.0683 | 3.2495 | 1.80610 | 88.97 | L6 |
| S17 | | 24.1530 | 24.1895 | | | |
| S18 | #C | −31.0882 | 3.9854 | 1.49270 | 57.49 | L7 |
| S19 | | −21.2001 | | | | |
| S20 | * | ∞ | 3.5000 | 1.49270 | 57.49 | L8 |
| S21 | #C | ∞ | | | | |
| S22 | * #C | ∞ | 3.5000 | 1.4927 | 57.49 | L9 |
| S23 | | ∞ | | | | |
| S24 | * #C | −1157.7242 | | | | M1 |
| S25 | * #C | −27.9480 | | | | M2 |
| S26 | * | ∞ | | | | SL (Image plane) |

TABLE 31

Example 6

Eccentricity data: *

| Si | XDE | YDE | ZDE | ADE |
|---|---|---|---|---|
| S0 (SG) | 0 | 0 | 0 | 0 |
| S3 (L1) | 0 | 11.4052 | 30 | 0 |
| S20 (L8) | 0 | See focus data | See focus data | 16.6752 |
| S22 (L9) | 0 | 49.2351 | 200.5538 | 16.6752 |
| S24 (M1) | 0 | 9.1912 | 229.3794 | −26.0325 |
| S25 (M2) | 0 | 103.878 | 175.9812 | −51.3292 |
| S26 (SL) | 0 | 0 | See focus data | −53.5133 |
| Size of an effective area of S0 (SG) | x-direction y-direction | | ±5.53 ±4.147 | |

TABLE 32

Example 6

Focus data

| | | (A) Shortest-distance projection state | (B) Long-distance projection state |
|---|---|---|---|
| S20 | YDE | 41.6806 | 50.5946 |
| | ZDE | 185.5939 | 193.3398 |
| S26 | ZDE | 507.0332 | 905.8348 |

TABLE 33

Example 6

Aspherical surface data of Si: #A

| Si | S3 | S14 |
|---|---|---|
| K | 0 | 13.9611 |
| A | −3.61541E−05 | −6.17165E−06 |
| B | −5.66929E−08 | −2.45793E−08 |
| C | −2.21282E−10 | 1.01058E−10 |
| D | 1.40557E−12 | −6.82380E−13 |

TABLE 34

Example 6

Polynomial free-form surface data of Si: #C

| C(j, k) | S18 | S21 | S22 | S24 | S25 |
|---|---|---|---|---|---|
| K | 0.0000 | 0.0000 | 0.0000 | −26.1820 | −4.3630 |
| C(0, 1) | 0.00000E+00 | 0.00000E+00 | 0.00000E+00 | 0.00000E+00 | 0.00000E+00 |
| C(2, 0) | −6.43037E−03 | −2.29591E−03 | −1.96640E−03 | −1.22334E−03 | −3.47145E−03 |
| C(0, 2) | −5.68410E−03 | 5.62317E−04 | 7.47417E−04 | 7.84159E−04 | −2.08644E−03 |
| C(2, 1) | −3.81115E−05 | 2.50633E−05 | 2.65473E−05 | −1.91418E−05 | 4.34188E−05 |
| C(0, 3) | 1.06135E−05 | −1.32748E−05 | −2.65688E−05 | −4.98055E−05 | 3.10584E−05 |
| C(4, 0) | −9.49996E−06 | 6.39180E−07 | 5.24841E−07 | −1.02137E−06 | 8.43917E−07 |
| C(2, 2) | −1.36495E−05 | −4.43621E−07 | −1.39649E−06 | 6.00074E−07 | 1.00952E−06 |
| C(0, 4) | −7.90449E−06 | −2.51379E−07 | −5.28181E−07 | 7.2703E−07 | −1.65359E−07 |
| C(4, 1) | 6.29975E−07 | −2.89900E−09 | −1.63312E−08 | 3.98685E−08 | −1.74206E−08 |
| C(2, 3) | 3.78340E−07 | −1.16274E−08 | 6.62106E−09 | 1.58273E−08 | −4.64592E−09 |
| C(0, 5) | −4.92125E−07 | 5.56967E−10 | 2.69682E−08 | 2.90139E−09 | 1.5882E−10 |
| C(6, 0) | −1.77550E−08 | −1.44316E−10 | −3.55032E−10 | 3.04539E−10 | −1.30037E−10 |
| C(4, 2) | −2.23092E−07 | −9.63360E−11 | 5.29303E−10 | −1.00239E−09 | 1.02851E−10 |
| C(2, 4) | −1.82198E−07 | 7.40097E−11 | 1.24128E−09 | −3.83783E−10 | 2.18317E−11 |
| C(0, 6) | 4.33154E−08 | 3.06162E−11 | 1.02779E−09 | −1.16166E−10 | 8.98117E−13 |
| C(6, 1) | −2.87969E−10 | −2.37646E−12 | 2.59758E−12 | −2.1066E−11 | 2.70245E−12 |
| C(4, 3) | 2.40444E−08 | 7.30981E−12 | 4.09688E−11 | 4.65142E−12 | 1.04817E−13 |
| C(2, 5) | 1.52641E−08 | 4.95962E−12 | −5.32093E−12 | −4.21835E−14 | 5.63009E−14 |
| C(0, 7) | −1.87364E−09 | −1.26868E−12 | −1.87762E−11 | 1.21940E−13 | 6.88359E−15 |
| C(8, 0) | −2.63538E−11 | 7.16667E−14 | 2.93237E−13 | 3.88737E−15 | 1.31478E−14 |
| C(6, 2) | −6.59712E−11 | 1.57620E−13 | 5.59237E−13 | 4.18314E−13 | −1.98299E−14 |
| C(4, 4) | −2.00908E−09 | 3.98036E−14 | −7.80564E−13 | 8.74574E−14 | −1.89500E−15 |
| C(2, 6) | −1.13030E−09 | −7.77863E−14 | −1.51391E−12 | 5.67278E−14 | −3.74577E−16 |
| C(0, 8) | −1.85054E−10 | 6.21380E−15 | −1.12913E−12 | 1.19888E−14 | −1.30372E−17 |
| C(8, 1) | 7.65353E−12 | 2.09666E−15 | 1.86129E−15 | 5.11737E−16 | −1.79028E−16 |
| C(6, 3) | 2.03921E−11 | 1.66435E−15 | −2.22681E−14 | −3.34096E−15 | 5.63176E−17 |
| C(4, 5) | 9.70276E−11 | −5.77455E−15 | −1.96158E−14 | −1.04749E−15 | −4.25497E−18 |
| C(2, 7) | 5.44117E−11 | −8.67595E−16 | 4.23947E−15 | −5.01644E−16 | −2.06890E−18 |
| C(0, 9) | 1.68195E−11 | 6.71173E−16 | 6.67482E−15 | −9.84235E−17 | −3.69824E−19 |
| C(10, 0) | −5.73177E−14 | 4.40276E−17 | −6.52867E−17 | −9.58880E−19 | −1.66368E−19 |
| C(8, 2) | −1.09214E−12 | −4.35477E−17 | −5.72575E−17 | −5.10899E−18 | 6.58407E−19 |
| C(6, 4) | −1.97190E−12 | 2.65012E−17 | −3.45569E−16 | 9.44090E−18 | −4.80081E−20 |
| C(4, 6) | −3.06322E−12 | −4.22062E−17 | 5.44632E−16 | 3.25983E−18 | 3.58148E−20 |
| C(2, 8) | −1.67103E−12 | 3.64313E−17 | 7.66181E−16 | 1.36531E−18 | 1.05320E−20 |
| C(0, 10) | −4.85174E−13 | −3.13365E−18 | 5.19052E−16 | 2.43165E−19 | 1.26912E−21 |

TABLE 35

| | (A) Shortest-distance projection state | | (B) Long-distance projection state | | Aperture radius R |
|---|---|---|---|---|---|
| | βx | βy | βx | βy | |
| Example 1 | 110.4590 | 109.9769 | 183.3194 | 183.9241 | 6.8664 |
| Example 2 | 110.3122 | 110.1123 | 183.3752 | 183.8890 | 6.8931 |
| Example 3 | 109.0113 | 108.6819 | 170.7482 | 170.1952 | 6.0580 |
| Example 4 | 109.9187 | 110.4346 | 164.2780 | 164.0942 | 6.5209 |
| Example 5 | −110.1071 | −110.2702 | −178.7036 | −178.3193 | 8.2208 |
| Example 6 | −108.5083 | −111.5333 | −183.2356 | −183.5040 | 5.0000 |

TABLE 36

| | Conditional formula | | | | |
|---|---|---|---|---|---|
| | (1), (1a) $\{(\tan\theta f1 - \tan\theta f2) - (\tan\theta n1 - \tan\theta n2)\} \cdot (\beta2/\beta1)$ | (2), (2a) $\theta f$ | (3) $\{(\delta1 + \delta2)/(2 \cdot P1)\} \cdot |\beta1|$ | (4) $(x1/P1) \cdot |\beta1|$ | (5), (5a) $\{(\delta1 - \delta2) \beta2\}/ \{(\delta1 + \delta2) \beta1\}$ |
| Example 1 | 0.09273 | 67.95 | 12.69 | 365.16 | 0.0020 |
| Example 2 | 0.06593 | 66.59 | 13.80 | 344.57 | 0.0709 |
| Example 3 | 0.03865 | 50.17 | 6.03 | 160.68 | −0.0137 |
| Example 4 | 0.04004 | 51.16 | 7.55 | 163.03 | 0.0186 |
| Example 5 | 0.07349 | 61.46 | 26.43 | 361.76 | 0.0090 |
| Example 6 | 0.02386 | 59.51 | 15.77 | 319.20 | 0.0112 |

| | $\beta1$ | $\beta2$ | $\beta1/\beta2$ | Screen size at $\beta1$ | Screen size at $\beta2$ |
|---|---|---|---|---|---|
| Example 1 | 183.62 | 110.22 | 1.67 | 99.9 | 60.0 |
| Example 2 | 183.63 | 110.21 | 1.67 | 99.9 | 60.0 |
| Example 3 | 170.47 | 108.85 | 1.57 | 92.8 | 59.2 |
| Example 4 | 164.19 | 110.18 | 1.49 | 89.4 | 60.0 |
| Example 5 | −178.51 | −110.19 | 1.62 | 97.2 | 60.0 |
| Example 6 | −183.37 | −110.02 | 1.67 | 99.8 | 59.9 |

The invention claimed is:

1. A projection optical system that receives light from a display device surface and enlarges and projects a display image thereon obliquely onto a screen surface and that varies a projection distance to a screen to display images of different projection magnifications, the projection optical system comprising:

one or more reflective surfaces having an optical power between the display device surface and the screen surface, wherein focus is adjusted by moving at least one optical device having an optical power, and conditional formula (1)' below is satisfied:

$$0.02 < \{(\tan\theta f1 - \tan\theta f2) - (\tan\theta n1 - \tan\theta n2)\} \cdot (\beta2/\beta1) < 0.20 \quad (1)'$$

where, when a screen of the display device surface is rectangular in shape, a direction of a normal to the screen of the screen surface is referred to as a "z-direction", a direction of a long side of the screen of the screen surface is referred to as an "x-direction", an x-z plane component of an angle of incidence with respect to the screen surface is referred to as an "incident angle $\theta$ (°)" and among rays that pass through a center of an aperture and that are incident on ends of upper and lower sides of the screen of the screen surface, the incident angle $\theta$ of rays whose incident angle $\theta$ is larger is referred to as "$\theta f$" and the incident angle $\theta$ of rays whose incident angle $\theta$ is smaller is referred to as "$\theta n$", $\theta f1$ represents, when an absolute value of a projection magnification is highest during focus adjustment, the incident angle $\theta f$, $\theta f2$ represents, when the absolute value of the projection magnification is lowest during focus adjustment, the incident angle $\theta f$, $\theta n1$ represents, when the absolute value of the projection magnification is highest during focus adjustment, the incident angle $\theta n$, $\theta n2$ represents, when the absolute value of the projection magnification is lowest during focus adjustment, the incident angle $\theta n$, $\beta1$ represents a maximum value of the projection magnification during focus adjustment (except that $\beta1$ represents, if the projection magnification is negative, a value of the projection magnification when the absolute value thereof is highest) and $\beta2$ represents a minimum value of the projection magnification during focus adjustment (except that $\beta2$ represents, if the projection magnification is negative, a value of the projection magnification when the absolute value thereof is lowest).

2. The projection optical system of claim 1, wherein conditional formula (2) below is satisfied:

$$38 < \theta f < 80 \quad (2).$$

3. The projection optical system of claim 2, wherein a distance from an exit pupil of rays incident on the screen at the incident angle $\theta f$ to the screen is shorter than a distance from an exit pupil of rays incident on the screen at the incident angle $\theta n$ to the screen.

4. The projection optical system of claim 1, wherein conditional formula (3) below is satisfied:

$$1 < \{(\delta1+\delta2)/(2 \cdot P1)\} \cdot |\beta1| < 30 \quad (3)$$

where, when, among rays that reach a center of the screen of the screen surface from a center of the screen of the display device surface, a ray passing through a center of the aperture is referred to as a "pupil center ray", and a length of a normal falling perpendicularly on the screen surface from an intersection between a reflective surface that is located closest to the screen among the reflective surfaces having an optical power and the pupil center ray is the projection distance, P1 represents the projection distance when the absolute value of the projection magnification is highest during focus adjustment, $\delta1$ represents, when the absolute value of the projection magnification is highest during focus adjustment, an absolute value of a difference between a distance from an exit pupil of rays incident on the ends of the upper side of the screen of the screen surface to the screen surface and a distance from an exit pupil of rays incident on the ends of the lower side of the screen of the screen surface to the screen surface, and $\delta2$ represents, when the absolute value of the projection magnification is lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

5. The projection optical system of claim 1, wherein conditional formula (3)' below is satisfied:

$$6.03\{(\delta1+\delta2)/(2\cdot P1)\}\cdot|\beta1|<30 \quad (3)'$$

where, when, among rays that reach a center of the screen of the screen surface from a center of the screen of the display device surface, a ray passing through a center of the aperture is referred to as a "pupil center ray", and a length of a normal falling perpendicularly on the screen surface from an intersection between a reflective surface that is located closest to the screen among the reflective surfaces having an optical power and the pupil center ray is the projection distance, P1 represents the projection distance when the absolute value of the projection magnification is highest during focus adjustment, δ1 represents, when the absolute value of the projection magnification is highest during focus adjustment, an absolute value of a difference between a distance from an exit pupil of rays incident on the ends of the upper side of the screen of the screen surface to the screen surface and a distance from an exit pupil of rays incident on the ends of the lower side of the screen of the screen surface to the screen surface, and δ2 represents, when the absolute value of the projection magnification is lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

6. The projection optical system of claim 1, wherein conditional formula (4) below is satisfied:

$$160<(x1/P1)\cdot|\beta1|<500 \quad (4)$$

where, when among rays that reach a center of the screen of the screen surface from a center of the screen of the display device surface, a ray passing through a center of an aperture is referred to as a "pupil center ray", and a length of a normal falling perpendicularly on the screen surface from an intersection between a reflective surface that is located closest to the screen among the reflective surfaces having an optical power and the pupil center ray is the projection distance, P1 represents the projection distance when the absolute value of the projection magnification is highest during focus adjustment, and x1 represents a half value of a width of the screen in the x-direction on the screen surface when the absolute value of the projection magnification is highest during focus adjustment.

7. The projection optical system of claim 1, wherein conditional formula (5) below is satisfied:

$$-0.02<\{(\delta1-\delta2)\beta2\}/\{(\delta1+\delta2)\beta1\}<0.2 \quad (5)$$

where

δ1 represents, when the absolute value of the projection magnification is highest during focus adjustment, an absolute value of a difference between a distance from an exit pupil of rays incident on the ends of the upper side of the screen of the screen surface to the screen surface and a distance from an exit pupil of rays incident on the ends of the lower side of the screen of the screen surface to the screen surface, and δ2 represents, when the absolute value of the projection magnification is lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

8. The projection optical system of claim 1, wherein conditional formula (5)' below is satisfied:

$$0.0090\leq\{(\delta1-\delta2)\beta2\}/\{(\delta1+\delta2)\beta1\}<0.2 \quad (5)'$$

where

δ1 represents, when the absolute value of the projection magnification is highest during focus adjustment, an absolute value of a difference between a distance from an exit pupil of rays incident on the ends of the upper side of the screen of the screen surface to the screen surface and a distance from an exit pupil of rays incident on the ends of the lower side of the screen of the screen surface to the screen surface, and δ2 represents, when the absolute value of the projection magnification is lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

9. The projection optical system of claim 1, further comprising:
at least one refractive optical device having an optical power.

10. The projection optical system of claim 1, wherein rotationally symmetrical axes of at least two optical devices coincide.

11. The projection optical system of claim 1, wherein at least one reflective surface is moved in the focus adjustment.

12. The projection optical system of claim 1, wherein at least one refractive optical device is moved in the focus adjustment.

13. A projection optical system that receives light from a display device surface and enlarges and projects a display image thereon obliquely onto a screen surface and that varies a projection distance to a screen to display images of different projection magnifications, the projection optical system comprising:
one or more reflective surfaces having an optical power between the display device surface and the screen surface,
wherein focus is adjusted by moving at least one optical device having an optical power, and conditional formula (1)' below is satisfied within at least a range specified by a formula "$1.3\leq\beta1/\beta2\leq1.8$":

$$0.02<\{(\tan\theta f1-\tan\theta f2)-(\tan\theta n1-\tan\theta n2)\}\cdot(\beta2/\beta1)<0.20 \quad (1)'$$

where, when a screen of the display device surface is rectangular in shape, a direction of a normal to the screen of the screen surface is referred to as a "z-direction", a direction of a long side of the screen of the screen surface is referred to as an "x-direction", an x-z plane component of an angle of incidence with respect to the screen surface is referred to as an "incident angle θ (°)" and among rays that pass through a center of an aperture and that are incident on ends of upper and lower sides of the screen of the screen surface, the incident angle θ of rays whose incident angle θ is larger is referred to as "θf" and the incident angle θ of rays whose incident angle θ is smaller is referred to as "θn", θf1 represents, when an absolute value of a projection magnification is highest during focus adjustment, the incident angle θf, θf2 represents, when the absolute value of the projection magnification is lowest during focus adjustment, the incident angle θf, θn1 represents, when the absolute value of the projection magnification is highest during focus adjustment, the incident angle θn, θn2 represents, when the absolute value of the projection magnification is lowest during focus adjustment, the incident angle θn, β1 represents a maximum value of the projection magnification during focus adjustment (except that β1 represents, if the projection magnification is negative, a value of the projection magnification when the absolute value thereof is highest) and β2 represents a minimum value of the projection magnification during focus adjustment (except that β2 represents, if the projection magnification is negative, a value of the projection magnification when the absolute value thereof is lowest).

14. The projection optical system of claim 13, wherein conditional formula (2) below is satisfied:

$$38 < \theta f < 80 \quad (2).$$

15. The projection optical system of claim 14, wherein a distance from an exit pupil of rays incident on the screen at the incident angle θf to the screen is shorter than a distance from an exit pupil of rays incident on the screen at the incident angle θn to the screen.

16. The projection optical system of claim 13, wherein conditional formula (3) below is satisfied:

$$1 < \{(\delta 1+\delta 2)/(2 \cdot P1)\} \cdot |\beta 1| < 30 \quad (3)$$

where, when, among rays that reach a center of the screen of the screen surface from a center of the screen of the display device surface, a ray passing through a center of the aperture is referred to as a "pupil center ray", and a length of a normal falling perpendicularly on the screen surface from an intersection between a reflective surface that is located closest to the screen among the reflective surfaces having an optical power and the pupil center ray is the projection distance, P1 represents the projection distance when the absolute value of the projection magnification is highest during focus adjustment, δ1 represents, when the absolute value of the projection magnification is highest during focus adjustment, an absolute value of a difference between a distance from an exit pupil of rays incident on the ends of the upper side of the screen of the screen surface to the screen surface and a distance from an exit pupil of rays incident on the ends of the lower side of the screen of the screen surface to the screen surface, and δ2 represents, when the absolute value of the projection magnification is lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

17. The projection optical system of claim 13, wherein conditional formula (3)' below is satisfied:

$$6.03 \leq \{(\delta 1+\delta 2)/(2 \cdot P1)\} \cdot |\beta 1| \leq 30 \quad (3)'$$

where, when, among rays that reach a center of the screen of the screen surface from a center of the screen of the display device surface, a ray passing through a center of the aperture is referred to as a "pupil center ray", and a length of a normal falling perpendicularly on the screen surface from an intersection between a reflective surface that is located closest to the screen among the reflective surfaces having an optical power and the pupil center ray is the projection distance, P1 represents the projection distance when the absolute value of the projection magnification is highest during focus adjustment, δ1 represents, when the absolute value of the projection magnification is highest during focus adjustment, an absolute value of a difference between a distance from an exit pupil of rays incident on the ends of the upper side of the screen of the screen surface to the screen surface and a distance from an exit pupil of rays incident on the ends of the lower side of the screen of the screen surface to the screen surface, and δ2 represents, when the absolute value of the projection magnification is lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

18. The projection optical system of claim 13, wherein conditional formula (4) below is satisfied:

$$160 < (x1/P1) \cdot |\beta 1| < 500 \quad (4)$$

where, when among rays that reach a center of the screen of the screen surface from a center of the screen of the display device surface, a ray passing through a center of an aperture is referred to as a "pupil center ray", and a length of a normal falling perpendicularly on the screen surface from an intersection between a reflective surface that is located closest to the screen among the reflective surfaces having an optical power and the pupil center ray is the projection distance, P1 represents the projection distance when the absolute value of the projection magnification is highest during focus adjustment, and x1 represents a half value of a width of the screen in the x-direction on the screen surface when the absolute value of the projection magnification is highest during focus adjustment.

19. The projection optical system of claim 13, wherein conditional formula (5) below is satisfied:

$$-0.02 < \{(\delta 1-\delta 2)\beta 2\}/\{(\delta 1+\beta 2)\beta 1\} < 0.2 \quad (5)$$

where

δ1 represents, when the absolute value of the projection magnification is highest during focus adjustment, an absolute value of a difference between a distance from an exit pupil of rays incident on the ends of the upper side of the screen of the screen surface to the screen surface and a distance from an exit pupil of rays incident on the ends of the lower side of the screen of the screen surface to the screen surface, and δ2 represents, when the absolute value of the projection magnification is lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

20. The projection optical system of claim 13, wherein conditional formula (5)' below is satisfied:

$$0.0090 \leq \{(\delta1-\delta2)\beta2\}/\{(\delta1+\delta2)\beta1\} < 0.2 \quad (5)'$$

where

δ1 represents, when the absolute value of the projection magnification is highest during focus adjustment, an absolute value of a difference between a distance from an exit pupil of rays incident on the ends of the upper side of the screen of the screen surface to the screen surface and a distance from an exit pupil of rays incident on the ends of the lower side of the screen of the screen surface to the screen surface, and δ2 represents, when the absolute value of the projection magnification is lowest during focus adjustment, the absolute value of the difference between the distance from the exit pupil of rays incident on the ends of the upper side of the screen of the screen surface to the screen surface and the distance from the exit pupil of rays incident on the ends of the lower side of the screen of the screen surface to the screen surface.

21. The projection optical system of claim 13, further comprising:
   at least one refractive optical device having an optical power.

22. The projection optical system of claim 13, wherein rotationally symmetrical axes of at least two optical devices coincide.

23. The projection optical system of claim 13, wherein at least one reflective surface is moved in the focus adjustment.

24. The projection optical system of claim 13, wherein at least one refractive optical device is moved in the focus adjustment.

25. A projection image display apparatus comprising:
   a display device forming a two-dimensional image and the projection optical system of claim 1.

26. A projection image display apparatus comprising:
   a display device forming a two-dimensional image and the projection optical system of claim 13.

* * * * *